US010642854B2

(12) United States Patent
Pattnaik et al.

(10) Patent No.: US 10,642,854 B2
(45) Date of Patent: May 5, 2020

(54) CLINICAL DATA AGGREGATION ARCHITECTURE AND PLATFORM

(71) Applicants: Sudeep Pattnaik, Bangalore (IN); Pankaj Manon, Bangalore (IN)

(72) Inventors: Sudeep Pattnaik, Bangalore (IN); Pankaj Manon, Bangalore (IN)

(*) Notice: Subject to any disclaimer, the term of this patent is extended or adjusted under 35 U.S.C. 154(b) by 160 days.

(21) Appl. No.: 15/727,930

(22) Filed: Oct. 9, 2017

(65) Prior Publication Data

US 2018/0101584 A1    Apr. 12, 2018

Related U.S. Application Data

(60) Provisional application No. 62/405,347, filed on Oct. 7, 2016.

(51) Int. Cl.
| | |
|---|---|
| *G06F 16/25* | (2019.01) |
| *G06F 16/84* | (2019.01) |
| *G06F 16/242* | (2019.01) |
| *G06F 9/38* | (2018.01) |
| *G06N 20/00* | (2019.01) |

(52) U.S. Cl.
CPC .......... *G06F 16/254* (2019.01); *G06F 9/38* (2013.01); *G06F 16/244* (2019.01); *G06F 16/86* (2019.01); *G06N 20/00* (2019.01)

(58) Field of Classification Search
CPC ...... G06F 16/254; G06F 16/86; G06F 16/244; G06F 9/38; G06N 20/00
See application file for complete search history.

(56) References Cited

U.S. PATENT DOCUMENTS

| 9,619,579 | B1* | 4/2017 | Courbage | G06Q 40/04 |
|---|---|---|---|---|
| 10,366,100 | B2* | 7/2019 | Horowitz | G06F 16/258 |
| 2015/0261882 | A1* | 9/2015 | Roberts | G06F 16/258 |
| | | | | 707/756 |

\* cited by examiner

*Primary Examiner* — Shahid A Alam
*Assistant Examiner* — Andalib F Lodhi
(74) *Attorney, Agent, or Firm* — Standley Law Group LLP

(57) ABSTRACT

A clinical data aggregation system and method, comprising ingesting, transforming and storing data in a clinical data lake. The present invention uses an Extract Load and Transform (ELT) rather than traditional Extract Transform and Load (ETL) design principle. The data hub platform leverages modern noSQL databases which makes the platform highly flexible to configure studies with any design complexity with relative ease.

26 Claims, 21 Drawing Sheets

ClinACT v1.3

Welcome, Adam Smith

Data Processor ▸ Configurations

NCT00002185

Data Processing Config

| Actions | Domain | Dataset Name | Form |
|---|---|---|---|
| ✎ 🗑 | CLINICAL | amp_scr | Ampu |
| ✎ 🗑 | CLINICAL | amp_post_scr | Ampu |
| ✎ 🗑 | CLINICAL | ae | Adver |
| ✎ 🗑 | CLINICAL | addcmt | Additi |
| ✎ 🗑 | CLINICAL | abpi | ABPI |
| ✎ 🗑 | CLINICAL | 24holter | 24_Hr |
| ✎ 🗑 | CLINICAL | 2d_echo | 2D_E |
| ✎ 🗑 | CLINICAL | cm | Conc |
| ✎ 🗑 | CLINICAL | cond | Condi |
| ✎ 🗑 | CLINICAL | discharge | Disch |
| ✎ 🗑 | CLINICAL | ecg_12 | ECG_ |
| ✎ 🗑 | CLINICAL | eos | End_ |
| ✎ 🗑 | CLINICAL | injsite | Exam |
| ✎ 🗑 | CLINICAL | inex_ex | Exclu |
| ✎ 🗑 | CLINICAL | gangrene | Gangi |
| ✎ 🗑 | CLINICAL | imp | IMP |
| ✎ 🗑 | CLINICAL | inex_in | Inclus |

Edit DataProcessor Config

Configuration | Mapping

| Variable | Column Name | Expression |
|---|---|---|
| Subject * | Patient ID | |
| Site | Site | |
| Visit | Visit | |
| Key Column | Event/Diagnosis | |

[Save]

ClinACT v1.3 — Welcome, Super Admin D

- Home
- Application Administration
- Data Standardization
- Risk Profile
- Central Data Review
- Dashboards
- Action Tracker
- Site Investigator Payments
- Discrepancy Management
- Data Processor
  - ▲ Configurations
  - ▲ Dashboard
  - ▲ Log
- System Administration

| Dataset Name | Form Name | Data Location Type | Data Location Name | Active |
|---|---|---|---|---|
| amp_scr | Amputation_Screening | FILE | Amputation_Screening.csv | ✓ |
| amp_post_scr | Amputation_Screening | FILE | Amputation_Post_Screening.csv | ✓ |
| ae | Adverse_Events | FILE | Adverse_Events.csv | ✓ |
| addcmt | Additional_Comments_by_investigator | FILE | Additional_Comments_by_investigator.csv | ✓ |
| abpi | ABPI | FILE | abpi-by Doppler.csv | ✓ |
| 24holter | 24_Hr_Holter | FILE | 24_Hr_Holter.csv | ✓ |
| 2d_echo | 2D_Echo | FILE | 2D_Echo.csv | ✓ |
| cm | Concomitant_Medication | FILE | Concomitant_Medication.csv | ✓ |
| cond | Condition_Of_Disease | FILE | Condition_Of_Disease.csv | ✓ |
| discharge | Discharge_Details | FILE | Discharge_Details.csv | ✓ |
| ecg_12 | ECG_Details | FILE | ECG_Details.csv | ✓ |
| eos | End_Of_Study_Form | FILE | End_Of_Study_Form.csv | ✓ |
| injsite | Examination_of_Injection_Site | FILE | Examination_of_Injection_Site.csv | ✓ |
| inex_ex | Exclusion_Criteria | FILE | Exclusion_Criteria.csv | ✓ |
| gangrene | Gangrene | FILE | Gangrene.csv | ✓ |
| imp | IMP | FILE | IMP.csv | ✓ |
| inex_in | Inclusion Criteria | FILE | Inclusion Criteria.csv | ✓ |

FIG. 13

ClinACT v1.3                                                                                                      Welcome, Super Admin D ⌄

▦ Data Processor ▸ Configurations

| NCT00002185 ⌄ | * |

Data Processing Config

| Actions | Domain | Dataset Name | Form |
|---|---|---|---|
| ✎ 🗑 | CLINICAL | amp_scr | Ampu |
| ✎ 🗑 | CLINICAL | amp_post_scr | Ampu |
| ✎ 🗑 | CLINICAL | ae | Adver |
| ✎ 🗑 | CLINICAL | addcmt | Additi |
| ✎ 🗑 | CLINICAL | abpi | ABPI |
| ✎ 🗑 | CLINICAL | 24holter | 24_Hr |
| ✎ 🗑 | CLINICAL | 2d_echo | 2D_E |
| ✎ 🗑 | CLINICAL | cm | Conc |
| ✎ 🗑 | CLINICAL | cond | Condi |
| ✎ 🗑 | CLINICAL | discharge | Disch |
| ✎ 🗑 | CLINICAL | ecg_12 | ECG_ |
| ✎ 🗑 | CLINICAL | eos | End_ |
| ✎ 🗑 | CLINICAL | injsite | Exam |
| ✎ 🗑 | CLINICAL | inex_ex | Exclu |
| ✎ 🗑 | CLINICAL | gangrene | Gangl |
| ✎ 🗑 | CLINICAL | imp | IMP |
| ✎ 🗑 | CLINICAL | inex_in | Inclus |

Edit DataProcessor Config
Configuration   Mapping

Domain *
[ CLINICAL ⌄ ]

Form Name *
[ Amputation_Screening ⌄ ]

Dataset Collection
[ ⌄ ]

Dataset Format *
[ FLAT_TEXT ⌄ ]

Dataset Name *
[ amp_scr ]

ODM Format Standard
[ ⌄ ]

☑ Active

Escape Character *
[ BACKSLASH ⌄ ]

Comment Token *
[ # ]

Quote Character *
[ DOUBLEQUOTE ⌄ ]

No of Lines to Ignore *
[ 0 ]

Separator Character *
[ COMMA ⌄ ]

No of Header Lines *
[ 1 ]

Data Location Type *
[ FILE ⌄ ]

Data Location *
[ Amputation_Screening.csv ]

[ Save ]

ClinACT v1.3     Welcome, Super Admin D

Data Processor ▸ Configurations

NCT00002185

Data Processing Config

| Actions | Domain | Dataset Name | Form |
|---|---|---|---|
| ✎ 🗑 | CLINICAL | amp_scr | Ampu |
| ✎ 🗑 | CLINICAL | amp_post_scr | Ampu |
| ✎ 🗑 | CLINICAL | ae | Adver |
| ✎ 🗑 | CLINICAL | addcmt | Additi |
| ✎ 🗑 | CLINICAL | abpi | ABPI |
| ✎ 🗑 | CLINICAL | 24holter | 24_Hr |
| ✎ 🗑 | CLINICAL | 2d_echo | 2D_E |
| ✎ 🗑 | CLINICAL | cm | Conc |
| ✎ 🗑 | CLINICAL | cond | Condi |
| ✎ 🗑 | CLINICAL | discharge | Disch |
| ✎ 🗑 | CLINICAL | ecg_12 | ECG_ |
| ✎ 🗑 | CLINICAL | eos | End_ |
| ✎ 🗑 | CLINICAL | injsite | Exam |
| ✎ 🗑 | CLINICAL | inex_ex | Exclu: |
| ✎ 🗑 | CLINICAL | gangrene | Gangı |
| ✎ 🗑 | CLINICAL | imp | IMP |
| ✎ 🗑 | CLINICAL | inex_in | Inclus |

Edit DataProcessor Config

Configuration    Mapping

| Variable | Column Name | Expression |
|---|---|---|
| Subject * | Patient ID | |
| Site | Site | |
| Visit | Visit | |
| Key Column | Event/Diagnosis | |

[Save]

FIG. 16

ClinACT v1.3     Welcome, Super Admin D

Data Standardization ▶ Mapping Type

All    SAE_RECON    SDTM

| Mapping Type | Domain | Mapping Variable | Variable Label | CDISC Notes |
|---|---|---|---|---|
| SAE_RECON | AE | AEACN | Action taken with study treatment | Describes changes to the study treatment as a result of the event. AEACN is sp |
| SAE_RECON | AE | AEDECOD | Dictionary-Derived Term | Dictionary-derived text description of AETERM or AEMODIFY. Equivalent to the |
| SAE_RECON | AE | DOMAIN | Domain Abbreviation | Two-character abbreviation for the domain. |
| SAE_RECON | AE | AEENDTC | End Date/Time of Observation | |
| SAE_RECON | AE | AEOUT | Outcome of Event | Description of the outcome of an event. |
| SAE_RECON | AE | AETERM | Reported Term | Verbatim name of the event. |
| SAE_RECON | AE | AESER | Serious Event | Is this a serious event? |
| SAE_RECON | AE | AESEV | Severity/Intensity | The severity or intensity of the event. Examples: MILD, MODERATE, SEVERE. |
| SAE_RECON | AE | AESTDTC | Start Date/Time of Observation | |
| SAE_RECON | AE | STUDYID | Study Identifier | Unique identifier for a study. |
| SAE_RECON | AE | SUBJID | Subject Identifier for the Study | Subject identifier, which must be unique within the study. Often the ID of the sub |
| SAE_RECON | AE | USUBJID | Unique Subject Identifier | Identifier used to uniquely identify a subject across all studies for all applications |
| SAE_RECON | CM | DOMAIN | Domain Abbreviation | Two-character abbreviation for the domain. |
| SAE_RECON | CM | CMDOSE | Dose per Administration | Amount of CMTRT taken. |
| SAE_RECON | CM | CMDOSFRQ | Dosing Frequency per Interval | Usually expressed as the number of repeated administrations of CMDOSE withi |
| SAE_RECON | CM | CMENDTC | End Date/Time of Medication | |
| SAE_RECON | CM | CMDECOD | Standardized Medication Name | Standardized or dictionary-derived text description of CMTRT or CMMODIFY. E |
| SAE_RECON | CM | CMSTDTC | Start Date/Time of Medication | |
| SAE_RECON | CM | STUDYID | Study Identifier | Unique identifier for a study |

ClinACT v1.3 — Welcome, Adam Smith

Data Standardization ▸ Library

Therapeutic Area: Bone / Osteoporosis — Portfolio Library

| Form Old | Domain | Variable | Item Old | | Literal | Expression |
|---|---|---|---|---|---|---|
| Adverse_Events | AE | AEDECOD | Event/Diagnosis | | | |
| Adverse_Events | AE | AESEV | | | | var x = $item("Severity"); if (Ix) x="Mild"; $value = x; |
| AEADVE | AE | AEACN | | | | var a1 = $item("AEACN1L"); var a2 = $item("AEACN2L"); var a3 = $item("AEACN3L"); var a4 = $item("AEACN4L"); var a99 = $item("AEACN99L"); $va |
| AEADVE | AE | AEACNOTH | AEACNOTH | | | |
| AEADVE | AE | AEBODSYS | AESOC | | | |
| AEADVE | AE | AEDOCOD | AEPT | | | |
| AEADVE | AE | AEENDTC | AEENDT | | | |
| AEADVE | AE | AEHLGT | AEHLGT | | | |
| AEADVE | AE | AEHLGTCD | AEHLGTC | | | |
| AEADVE | AE | AEHLT | AEHLT | | | |
| AEADVE | AE | AEHLTCD | AEHLTC | | | |
| AEADVE | AE | AELLT | AELLT | | | |
| AEADVE | AE | AELLTCD | AELLTC | | | |
| AEADVE | AE | AEONGO | AEONGO | | | |
| AEADVE | AE | AEOUT | AEOUTL | | | |
| AEADVE | AE | AEOUTOTH | AEOUTOTH | | | |
| AEADVE | AE | AEPT | AEPT | | | |

CLINICAL DATA AGGREGATION ARCHITECTURE AND PLATFORM

CROSS-REFERENCE TO RELATED APPLICATIONS

This application claims priority to U.S. Provisional Application No. 62/405,357, filed Oct. 7, 2016 which is hereby incorporated by reference in its entirety.

BACKGROUND OF THE INVENTIVE FIELD

The present invention is directed to a clinical data aggregation platform (ClinDAP) for loading, aggregating, standardizing and presenting (using dashboards and charts) data from various source systems supporting clinical drug development processes.

The clinical and non-clinical data captured by the various systems supporting clinical trials (eDC, Lab, CTMS, IVRS/IWRs etc.) in an organization is highly fragmented. The high degree of variability in data is attributed due to things such as regulatory requirements for capturing data in EDC systems, study design, different technology vendors, etc. The data originating from these disparate systems and formats makes it quite challenging to combine and build comprehensive business intelligence.

The product stack of the present invention supports loading, standardizing and aggregating data from various clinical systems in a central data hub. The source data is standardized by leveraging CDISC SDTM format using a data standardization engine. These standardized data sets are exposed through dashboards, visualizations, risk triggers, etc. in the ClinACT product and a connector that enables to integrate with external leading BI tools and clinical data aggregation platform service layer.

SUMMARY OF THE GENERAL INVENTIVE CONCEPT

In one embodiment of the invention, the system is comprised of: inventive data structures with robust versioning support of data including:

- an innovative pipeline architecture to load the source data and invoke post-processing components to aggregate the data;
- pipeline nodes that can be dynamically turned on based on customer requirements;
- loaded data tagged with raw dataset identifiers at each level to enable reconciliation with source data at any point;
- standardized source clinical data using advanced mapping and a transformation engine that converts the data into CDSIC SDTM compliant data sets;
- processing ability to extract mapping libraries at therapeutic and study levels that allow machines to learn over time and provide ability for auto mapping;
- SDTM domains and variables that can be extended to map source clinical data that does not have default placeholders in the SDTM definition. The custom extensions are surfaced in the mapping tool that can be mapped with the source data.

In one embodiment of the invention, the present invention is a system for loading and mapping source data into a predetermined standard format, the system comprising:

a database for storing the source data;
a graphical user interface comprised of multiples screens for displaying on a display screen, the graphical user interface having:
  i) a first area having a user selectable list of types of source data that can be loaded by the system;
  ii) a second area having a user selectable list of data formats of the source data;
  iii) a third area configured to allow a user to input a plurality of key identifiers for the source data, wherein each key identifier identifies a predetermined data item or items of the source data;
  iv) a fourth area for setting mapping rules by mapping a plurality of data items to a plurality of target fields or variables of the predetermined standard format;
  v) a fifth area for inputting a plurality of expressions, wherein each of the expressions are used to transform a predetermined data item or items of the source data into a target value;
  a hardware processing system, the hardware processing system programmed with instructions for executing on the hardware processing system for: 1) loading data items of the source data into the database as pairs of key identifier and value for each data item or items; 2) transforming the loaded source data using the mapping rules and expressions into a predetermined standard format; 3) comparing loaded source data with stored ontology data and mapping data items from the source data to variables of the predetermined standard format; 5) comparing the source data with a model of the predetermined standard format and using pattern matching algorithms to automatically map the source data to the predetermined standard format.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 8 illustrates one embodiment of the Inbound Data Descriptors screen of the present invention.

FIG. 9 illustrates a sample screen shot for the data processing configuration module component illustrating the ability to set the domain of the source data (e.g., what kind of data is being loaded).

FIG. 10 illustrates a sample screen shot for the data processing configuration module component illustrating the ability to set the dataset format of the source data.

FIG. 11 illustrates a sample screen shot for the data processing configuration module component illustrating the ability to set the key column identifier.

FIG. 12 illustrates a sample screen shot for the data processing configuration module component illustrating the ability to set the ODM format standard.

FIG. 13 illustrates one embodiment of a user interface for creating a new IDD configuration.

FIG. 14 illustrates one embodiment of a user interface for updating data set parameters for the IDD.

FIG. 15 illustrates one embodiment of a user interface for updating default directives in the case of a FLAT_TEXT type.

FIG. 16 illustrates one embodiment of a user interface for updating the mappings for the IDD.

FIG. 17 illustrates one example user interface for the mapping type configuration view.

FIG. 18 illustrates an example embodiment of the mapping workbench user interface of the present invention.

FIG. 19 illustrates an example embodiment of the domain mapping user interface of the present invention.

FIG. 20 illustrates another example embodiment of the mapping user interface of the present invention.

FIG. 21 illustrates one example of a graphical user interface showing available library of expressions.

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

The ClinDAP data hub platform of the present invention uses a non-traditional approach to data warehousing to ingest, transform and store data in a clinical data lake. It uses an Extract Load and Transform (ELT) rather than traditional Extract Transform and Load (ETL) design principle. ETL is a concept which separates the extraction of the data from external sources (E), transforms the data for operational needs (T), and loads the data into a final deliverable data set (L). The present invention's Data Inbound Manager, as part of ClinDAP data hub, loads the data into the hub. The data is loaded without any transformations. No data irrespective of issues with format or inconsistencies, is rejected or ignored during the ingestion process.

The ClinDAP data hub platform leverages modern noSQL databases which makes the platform highly flexible to configure studies with any design complexity with relative ease. Traditional data warehouse solutions using relational databases rely on study metadata to build the data structures dynamically which brings in high degree of complexity. The ClinDAP data hub is not dependent on the study metadata for ingestion of data.

The data transformation is not limited to a CDISC SDTM model. This model is the standard format requested by the FDA for clinical trial data submission. (The SDTM provides a general framework for describing the organization of information collected during human and animal studies.)

The ClinDAP data hub also provides the ability to define a custom transformation data model. An extensive API as part of the data transformation engine is available for SDTM and custom transformations. The time, cost and effort to deploy and maintain the ClinDAP data hub solution is significantly lower than traditional data hub solutions.

The current gold standard is to use a traditional data warehouse approach to load, standardize and aggregate the clinical and non-clinical data originating from various systems supporting clinical trials data to present a unified view of the subject. The data typically is:
1. staged in a staging area;
2. from the staging area, it is moved to standardized operational data area;
   a. standardization rules are typically built using excel spreadsheets and macros, or PL/SQL stored procedures and complex programming logic is used for standardizing the data sets;
3. data from the operational schema is converted into data marts and delivered to consuming applications.

Figure 1:
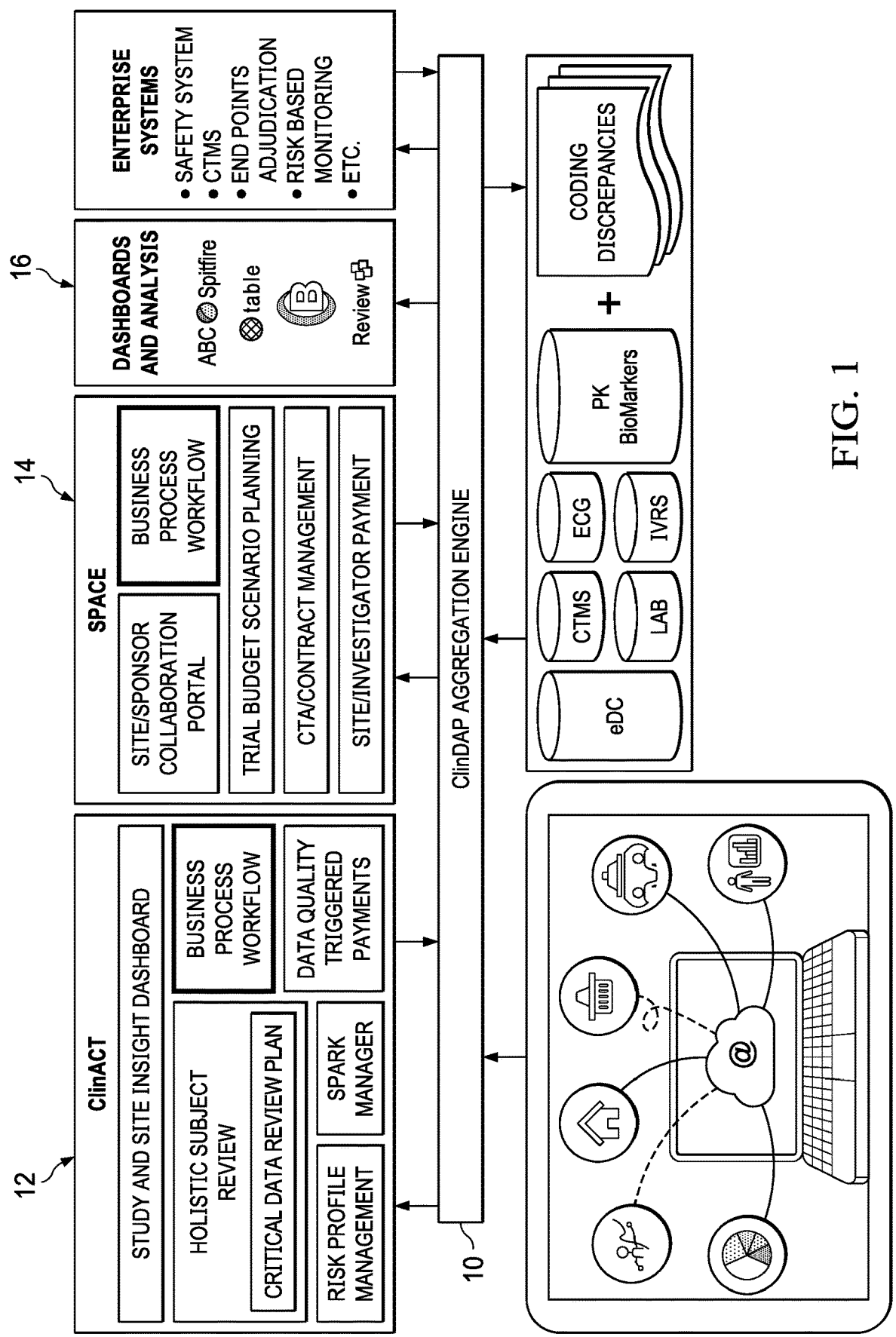
FIG. 1 illustrates a block diagram showing the clinical data aggregation engine of the present invention as it integrates with other components and processes.

The clinical data aggregation platform (ClinDAP) data hub of the present invention uses a novel inbound data manager component (IDM) to load the source data into the ClinDAP data lake. FIG. 1 illustrates a block diagram showing the clinical data aggregation engine 10 of the present invention as it integrates with other components and processes. As illustrated, the clinical data aggregation engine interfaces with ClinACT 12, SPACE 14, and other dashboards and analysis tools 16.

ClinACT and SPACE are additional examples of enterprise systems which interface with the clinical data aggregation platform of the present invention. ClinACT is a risk based monitoring tool whereas SPACE is a site payment and contracting environment. Both these systems connect to the clinical data aggregation platform for its data requirements. The clinical data aggregation platform can provide data to enterprise systems used in the clinical product development organization.

Figure 2:
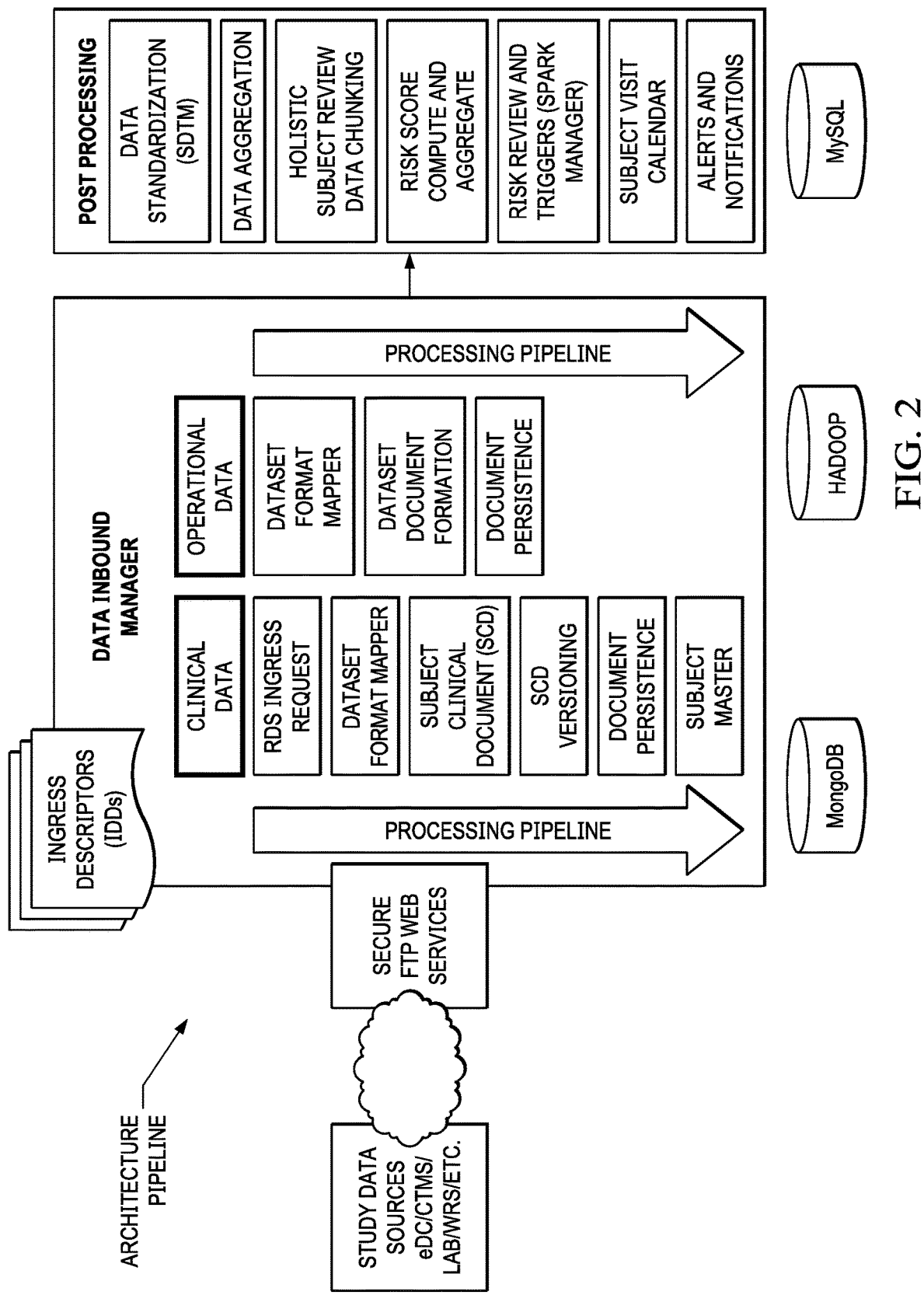
FIG. 2 illustrates one embodiment of the architectural pipeline of the present invention.

The IDM component of the present invention leverages a pipe line architecture, that is extendible using the published APIs. FIG. 2 illustrates one embodiment of the architectural pipeline of the present invention. An important differentiator here is that IDM does not use the traditional Extract Transform Load (ETL) paradigm whereas it performs Extract Load and Transform (ELT) on the data. Typically, the relational data warehouses are built using ETL tools whereas the IDM of the present invention loads the source data in the ClinDAP data lake. Incoming source data is not rejected for any discrepancies in data format or inconsistencies by IDM. The transformation part of the ClinDAP data process is unique as it provides the end user the ability to define their own source to target mapping through a simple user interface and transform the data based on the mapping.

The data hub of the present invention preferably leverages modern noSQL database technology rather than traditional relational databases that enforce strict schema and data types. The ClinDAP's IDM component of the present invention is not tightly coupled with the study metadata repository to be configured in order to start ingestion of data. Data ingestion can start while the study metadata is still being configured in the repository. As the data is loaded in a noSQL database, there is no requirement to pre-model the data structures based on metadata before the ingestion starts.

During the data ingestion of source clinical data, the system provides versioning support for any change in the data for a subject. A new document of subject clinical data is created and versioned with the updates being received.

The versioning of transformed/standardized data is also inherently built into the system. The new version of transformed data is created:

a. if the source data is updated
b. the mapping is changed using the ClinDAP UI mapping tool of the present invention.

The ClinDAP data transformation engine (DTE) of the present invention uses a unique Javascript based API to build the transformation expressions. The data transformation engine provides rich library of functions that can enable building relatively easy to very complex transformation rules. The mapping rules of the data transformation engine can be extracted to a therapeutic and study library which is used with "smart map" function that allows auto mapping of study variables. Typically, in a clinical research and development organization, the mappings are restricted to STDM data sets which are built using SAS programming. With the ClinDAP data hub and data transformation engine component, users can not only build SDTM mappings but can create custom mapping models based on their organization needs. This custom mapping provides flexibility and reduces significant time in repurposing the data and making it available to the end users.

One of the key differentiator is that the ClinDAP data hub IDM component of the present invention is source and data format agnostic. The IDM can ingest data from leading eDC vendors, and supports formats such as—ODM, flat files, line listing reports, SAS datasets, XML, JSON etc.

Figure 3:
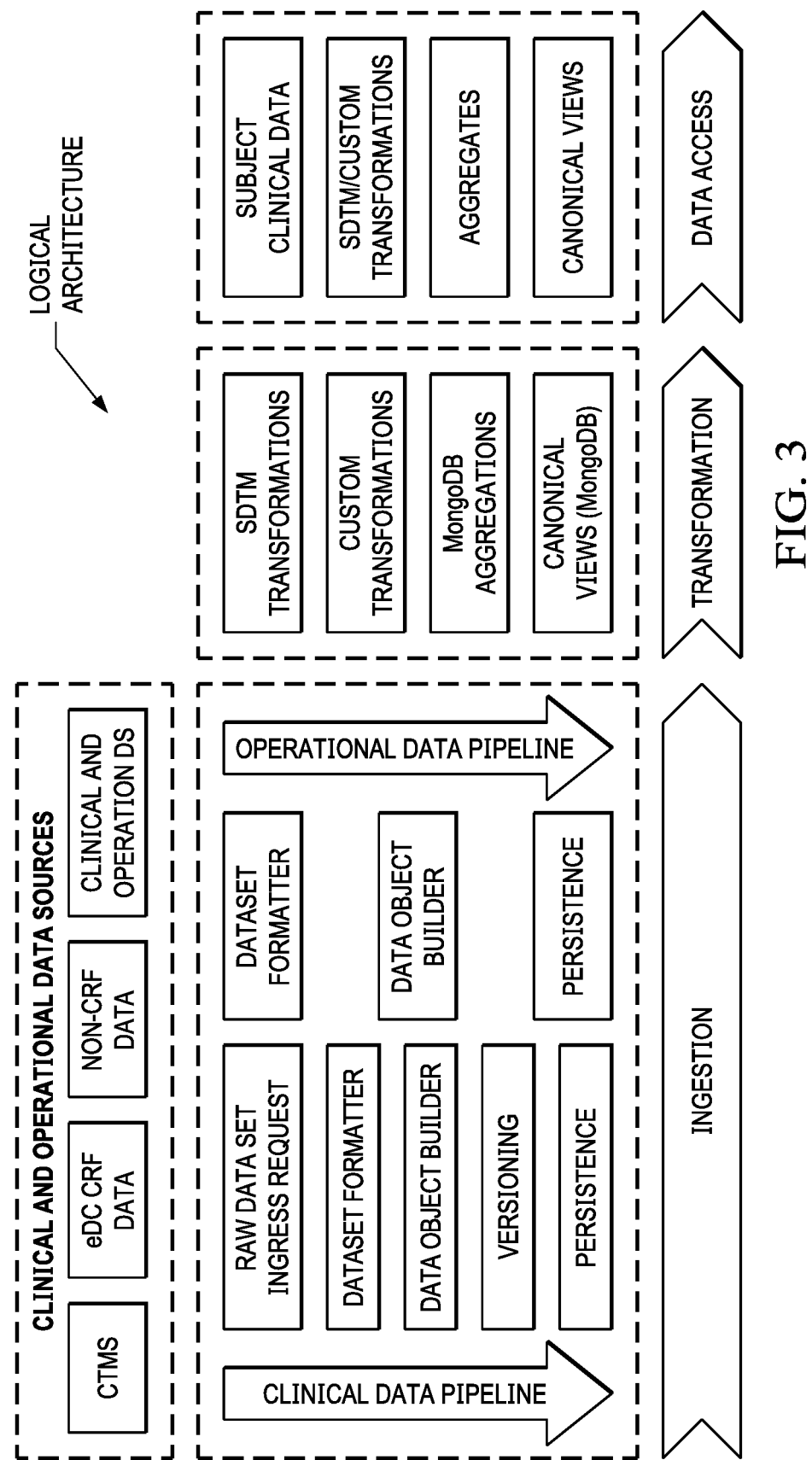
FIG. 3 illustrates one example embodiment of the logical architecture of the present invention.

The ClinDAP data hub platform of the present invention uses a non-traditional approach to data warehousing to ingest, transform and store data in a clinical data lake. FIG. 3 illustrates one example embodiment of the logical architecture of the present invention. Data is loaded into the data lake using an inbound data manager (IDM) component, which is preferably built using an extendible pipeline architecture. The raw source data loaded in the data hub is transformed into standard SDTM or custom user defined data model(s). The platform leverages a noSQL database (e.g., MongoDB) to store and aggregate the clinical and operational data originating from disparate systems.

The ClinDAP data hub provides a secure data access layer to make the source data, transformed and aggregated information from the hub, available to enterprise reporting and dashboard solutions along with other systems supporting clinical trial processes.

Data Ingestion

The inbound data manager (IDM) component of the present invention uses an innovative pipeline architecture to load the source data into the clinical data lake. The pipeline is constituted using pipeline nodes, where each node performs a specific set of task(s) and passes the information to the next node for processing. For example, see the "raw data set (RDS) ingress request" node, and the "dataset format mapper" node, etc. of FIG. 2. The pipeline nodes can be reused while developing new system supported or custom data processing pipelines. The pipeline nodes can be dynamically turned on based on the customer requirements.

The source data ingested by the IDM of the present invention is loaded into unique key-value structures in the database. A key-value pair is a representative of data, where a key is a unique identifier for the data item and where the value is the data value identified by the unique key.

The advantage of storing the data in a key-value pair is the system doesn't have to define the study specific data model prior to loading the data. In a traditional approach the data model for the study is dynamically built using the study metadata i.e., eDC form and form items. This complexity is due to the fact that each study is configured based on its unique design which varies from study to study.

With the key-value pair storage approach in ClinDAP the metadata forms items and values that are saved as key and value, respectively. Unlike the traditional approach upfront structure, using form as table and item as table field, is not required. This approach also allows the ClinDAP ingestion component "Inbound Data Manager" to be independent from study metadata and to allow upfront configuration.

Sample representation of subject_clin_data collection which stores the crf data:

```
{
  "_id" : ObjectId ("5774ec2c45b22730a7f99e10"),
  "className" : "com.ac.dc.data.SubjectClinicalData",
  "dv" : {
    "t" : "2016-06-30T09:53:48.753UTC",
    "rdf" : "5774ec2c45b22730a7f99e0f"
  },
  "studyId" : "STUDY_1",
  "sbjId" : "01015",
  siteId : "VO-01",
  "formdata" : [
    {
      "vid" : "VISIT1",
      "fid" : "Chest_X-Ray",
      "itemdata" : [
        {
          "ikey" : {
            "iid" : "If Yes, whether it is Normal, Abnormal-NCS, Abnormal CS"
          },
          "ival" : {
            "raw": "NORMAL"
          }
        },
        {
          "ikey" : {
            "iid" : "Dose Group"
          },
          "ival" : {
            "raw" : "2 MILLION AAA/KG BODY WEIGHT"
          }
        },
        {
          "ikey" : {
            "iid" : "Site"
          },
          "ival" : {
            "raw" : "VO-01"
          }
        },
        {
          "ikey" : {
            "iid" : "If Yes, whether it is Normal, Abnormal-NCS, Abnormal CS-Comments"
          },
          "ival" : {
            "raw": ""
          }
        },
        {
          "ikey" : {
            "iid" : "Was Chest X-ray performed?"
          },
          "ival" : {
            "raw" : "Y"
          }
        }
      ]
    }
  ]
}
```

Incoming data is not rejected. Any inconsistent data (e.g., such as incomplete dates or non-numeric data where number is expected etc.) or data elements with incorrect format, etc. are stored as in the data lake. A data lake is a data repository where the data is stored in raw format, i.e. no transformation applied. Transformations and aggregations on the source data in the data lake are built based on the business use case and requirements. During the transformation phase the inconsistent data can be processed as per the business requirements.

The IDM component of the present invention works on the Inbound Data Descriptors (IDDs) that define the source data characteristics such as format, data types, key identifiers, etc. IDM uses IDDs to load and process the source data. The IDDs are configured using a data processing configuration module component of the ClinDAP UI application. An IDD is defined for each type of data set that will be ingested into the ClinDAP data lake.

For the dataset types of FLAT_FILE, LINE_LISTINGS etc. the IDD configuration requires only the key fields to be mapped that will uniquely identify the data set record—key fields: Subject Column Identifier, Site Column Identifier, Visit column name, Key column Identifier (this is to allow users to define additional keys provided as comma separated value).

For the structured data set types such as CDISC, ODM, and eDC specific ODM extensions, the IDD will auto identify the key columns. Minimal configuration is required for structured data set types.

The following directives can be captured in IDD to define the characteristics of the incoming file:
  Escape character—defines the character that overrides special meaning associated with the directive and processes it as data;
  Quote character—character used to enclose the data values e.g. "(single or double quotes);
  Separator character—character that delimits the data value e.g. (comma, or pipe |);
  Comment token—comments identifier, usually at the beginning of file e.g. (hash #);
  No. of lines to ignore—a number that defines how many number of lines to ignore processing from the beginning of the data file;
  No. of header lines—number of lines at the beginning of the file that defines the column headings.

The IDD can be pointed to load from a specific file every time the file is received or can be directed to load all the data files in a directory. IDM will apply the same directives to all the files if loading from the folder.

Figure 8:
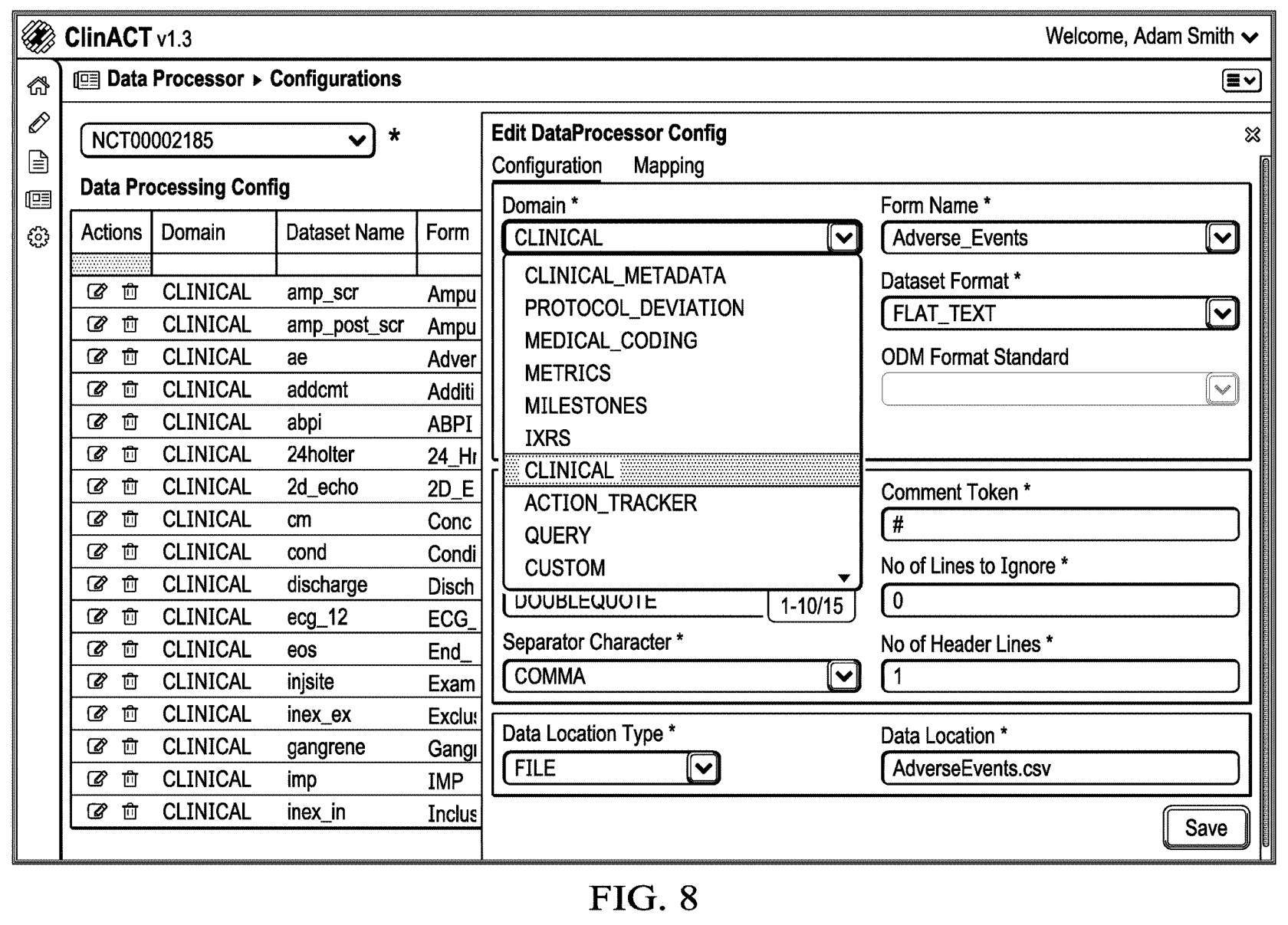

IDDs are unique to ClinDAP. IDDs are configured for each type of source data being ingested into ClinDAP. IDDs are configured through the ClinDAP user interface (UI). FIG. 8 illustrates one embodiment of the IDD screen of the present invention. For example, if the source of data is Rave ODM, users will have to configure an IDD to load ODM metadata and an IDD for the ODM data file.

In case of text files such as comma (delimited) separated values, for each type of data file being sent to the system an IDD will have to be configured.

The ClinDAP's IDM component is source data vendor, data source type and format agnostic. That is, it can ingest data originating from electronic data capture systems provided by different vendors. The present invention supports the loading of data in formats such as default CDISC ODM, ODM with vendor specific extensions (RAVE, Inform ODM), line listings, delimited text files and SAS datasets.

Using the IDM component of the present invention, similar data from multiple sources and format can be collocated in a common collection. For example the clinical data from eDC systems in ODM format and clinical data received from LAB (central/local) in delimited text format can be saved in a subject clinical data collection. The data from different sources can be combined to a standard data set during transformation.

The IDM component of the present invention provides a robust support for logging and error reporting capabilities with a feedback loop to identify the issues while loading the data. In case of an error while processing a specific file, the system will provide feedback through:
  a. Notification to the administrators that something has failed for a study.
  b. Logging the error in a table (data_processing_log), details can be viewed by administrators using the UI.
  c. Allowing Users to review the details of the ClinDAP data load and transformation jobs completed using the data processor dashboard. It shows comparative analysis by study, a data processor component and the time taken to complete (by each component).

It is a highly scalable solution that can process a large number of studies on an optimum schedule and provide an easy interface to an operational team managing the deployment of ClinDAP data hub platform.

Transformation

The clinical and non-clinical data can be transformed into CDISC standard SDTM or custom user defined data model (s) using the ClinDAP's data transformation engine (DTE). Clinical data ingested from crf (eDC) and non-crf (lab data etc.) data sources along with non-clinical data such as queries, subject, status, etc., can be transformed/standardized using the DTE engine of the present invention.

The DTE component of the present invention supports a user's ability to extend the standard SDTM data model or define user specific data model(s) (such as an enterprise reporting data model, etc.) for data standardization. Multiple versions of the SDTM model can be mapped to different studies configured in the ClinDAP component based on the study specific requirement.

The DTE component of the present invention provides an extensive API that allows users to develop complex transformation rules using expressions in the mapping engine. It provides methods and functions (list provided below) to access a subject's clinical and non-clinical data for the rules defined in the transformation. An "$auto" expression is available as part of an API that can be mapped to specific SDTM variables expression mapping. DTE will auto standardize those variables based on pre-defined rules. "$auto" is from the ClinDAP mapping API that can be assigned to a mapping variable expression. If "$auto" is used in the expression, the DTE will auto assign the value to the mapping variable based on pre-defined rules. For example, the Study ID variable can be mapped using the "$auto" expression. In the transformed data set, the system will auto assign the value to the Study ID variable with the study identifier for which the DTE is executed.

The mapping engine also supports defining literals and one-to-one mapping between study metadata and mapping data model elements. The DTE component of the present invention allows users to extract mapping libraries at the therapeutic area and study level from the mappings available in the system. A smart map feature provided in the ClinDAP mapping UI, auto maps the domain variables based on the mapping library. The smart map algorithm uses weighted ranking of the mappings in the therapeutic and study library based on historical usage for auto mapping. A comprehensive list of mappings available in the library can significantly reduce the manual effort of mapping by using the smart map feature.

The mapping and transformation for operational data such as milestone/metrics, recruitment plan, site visit report etc. can be performed while defining the Inbound Data Descriptors.

The data loaded and processed in the ClinDAP data lake is tagged with a raw dataset identifier at each level to enable reconciliation with source data at any point.

The source clinical data is transformed/standardized using advanced mapping and transformation engine that converts the data into CDSIC SDTM compliant or user defined custom data sets.

- The API uses ECMA compliant Javascript programing language supported by Oracle's Nashorn engine. Apart from using the DTE API users can leverage the core Javascript functions and methods for building the complex expressions.
- DTE allows users to extract mapping library at therapeutic area and study level from the mappings available in the system. Smart map feature provided in ClinDAP mapping UI, auto maps the domain variables based on mapping library.
- The SDTM domains and variables can be extended to map source clinical data that does not have default placeholders in the SDTM definition (SDTM+). The custom extensions are surfaced in the mapping tool that can be mapped with the source data.
- System allows user to create custom mapping data model for data transformation based on business specific use case and requirement.

Sample DTE API functions: these functions are part of ClinDAP data transformation engine API. They allow users to build complex transformation rules.

```
$auto
$item(itemOid <,formOid,eventOid,iscoded>)
$lab(itemId <,formId>).getLow( );
$lab(itemId <,formId>).getHigh( );
$lab(itemId <,formId>).getUnits( );
$search(defaultItemOid, otherFormOid, otherCriteriaOid,
otherReturnValOid);
$subject.status;
$subject.date;
$subject.comments;
$forms( );
$items(formObj);
$visitName( )
$formName( )
$sdtm(domainName.variable)
$scd(formOid.ItemOid)
```

Aggregation and Post Processing Components

After the transformation and standardization, the aggregation post-processing component of the present invention builds roll-up, cross study and statistical (e.g., min, max, averages and standard deviations) aggregates. Sample roll-up aggregates include: a_adverse_events, a_end_points, a_subject_recruitment, aggregates by SDTM domain, etc. Statistical aggregates such as minimum, maximum, average and standard deviation for LB, VS, endpoint domains, etc. The default aggregations are preferably built using MongoDB aggregate and map reduce functions.

The source data along with standardized and aggregated data can be combined with external semi-structured and non-structured data sources using Apache Spark and Apache Hadoop platforms for generating meaningful insights and dashboards. The ClinDAP component of the present invention provides out of the box integration with FDA adverse event reporting system.

The present invention provides other optional post processing nodes to support the ClinACT risk based monitoring solution platform. For example, Visit Calendar, Missing Forms, Open Queries, Uncoded Terms, Subject Review processing, Risk Trigger, Recruitment Plan, Action Triggers and Study coding. The ClinDAP processor provides the ability to turn the post-processing components on or off based on the business requirements.

Data Access

The ClinDAP data hub component of the present invention provides secure access to the data through a service and business intelligence layer for external systems (enterprise clinical systems within the organization) and enterprise reporting and dashboard tools.

The data can be accessed through an extendible service layer by sending a request to the ClinDAP published or custom end points. Endpoints are a kind of web address exposed by the ClinDAP service layer to integrate with external systems (external to ClinDAP). An example of an endpoint published by ClinDAP service layer is SDTM.AE.json/<study_id>. The external system will request data from ClinDAP service layer by invoking the URL—https://clindap.company.com/SDTM.AE.json/SAMPLE_STUDY_Id which will return the AE data for the study SAMPLE_STUDY in JSON format. List of end points available in ClinDAP application are:

Transformed/standardized data sets by type;
Source clinical data from "subject_clinical_data" collection—latest document version or by version requested;
Canonical views of the default entities—queries, audit entries, raw datasets, form status, subject status etc.

Figure 4:
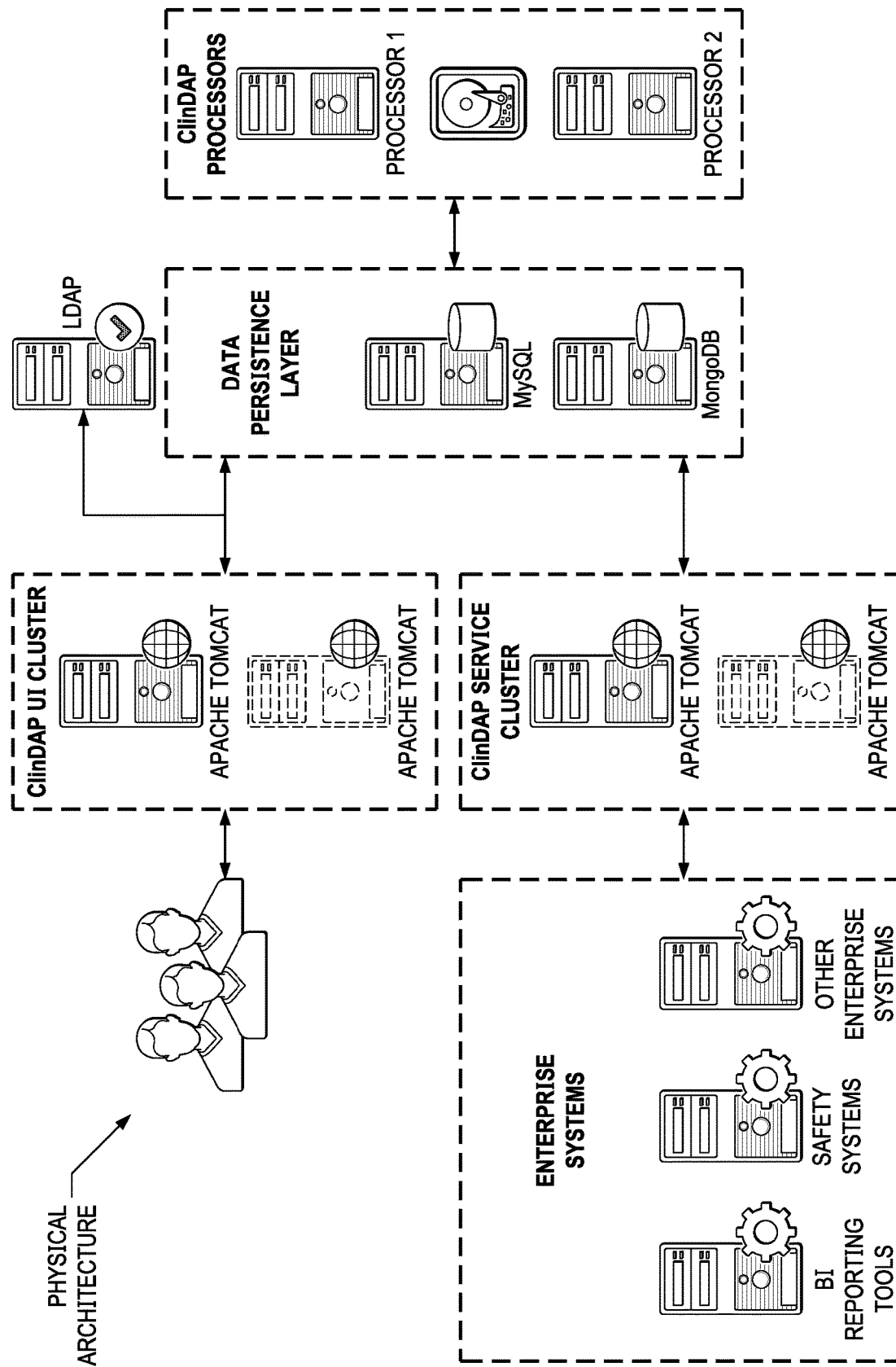
FIG. 4 illustrates one embodiment of the physical architecture of the present invention.
Figure 5:
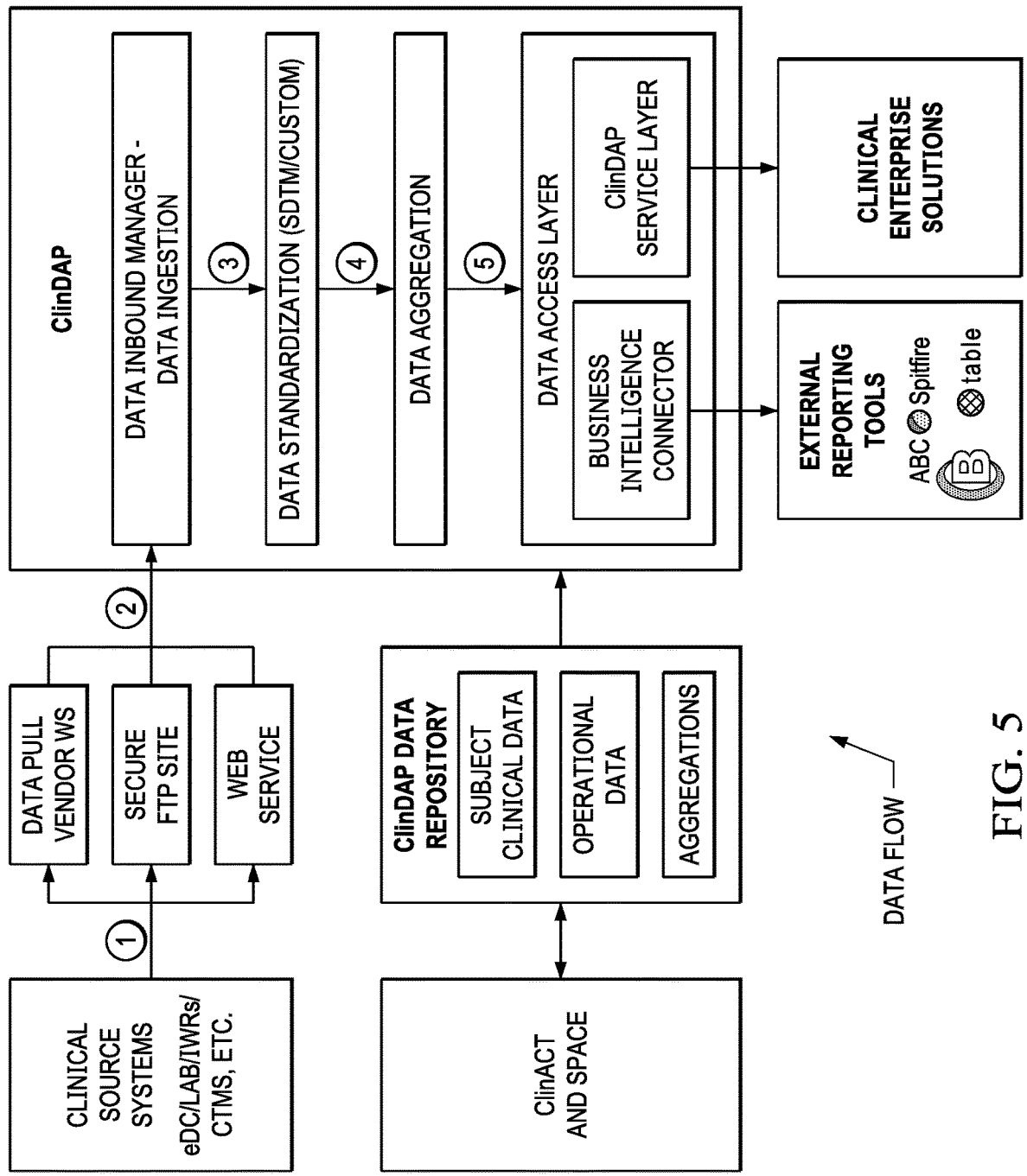
FIG. 5 illustrates one embodiment of the data flow of the present invention.

FIG. 4 illustrates one embodiment of the physical architecture of the present invention. FIG. 5 illustrates one embodiment of the data flow of the present invention.

Authentication

The ClinDAP Service layer component of the present invention uses a database table (e.g., m_user in MySQL) as credential store to authenticate data requests from external systems. The integration users are identified by a flag in the m_user table and are not allowed to login using the ClinDAP UI interface. Each external system will be provided with a unique userid and secure password. The userid and password are preferably passed with the service call using HTTP header variables, which can be encrypted as required (https). The integration user password is preferably stored as a hash value in the m_user table. The hashed password is compared with the hashed value of user entered password to confirm the authenticity of user.

Authorization

The integration users in the ClinDAP component of the present invention are assigned to a single or to multiple studies depending on the business use case. The data visibility to external systems is based on the studies assigned to the integration user.

Figure 6:
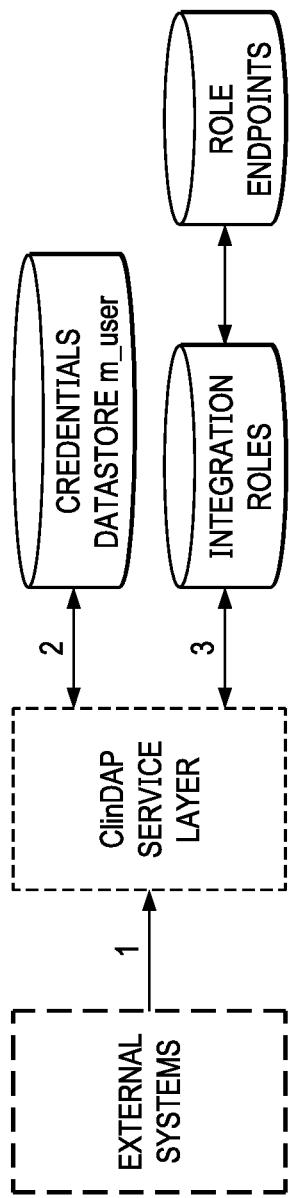
FIG. 6 illustrates one embodiment of the access service layer of the present invention.

A ClinDAP service API layer provides a role based design to authorize access for the external systems to the configured endpoints. The system allows configuration of access for each endpoint by assigning it to the role(s). The service call requests will be constrained based on endpoint access configured in the system. FIG. 6 illustrates one embodiment of the access service layer of the present invention.

ClinDAP UI

A ClinDAP UI provides views to allow users to configure Inbound Data Descriptors (IDDs) by study. IDD configuration is used by ClinDAP to identify which Inbound Data Manager pipeline to invoke, the location of the data file(s)

on the disk, the file format e.g. ODM or flat file, the field delimiter and key data identifier fields in case of text files.

Access control for service layer and ClinDAP UI is managed through the access control module. Details of authentication and authorization for ClinDAP UI is detailed below.

Authentication

The ClinDAP UI of the present invention provides a configurable authentication architecture leveraging a Java Spring security framework. By default the system is enabled for database authentication using the credential store m_user in MySQL database. The user password is preferably stored as a hash value in the m_user table. The hashed password is compared with the hashed value of user entered password to confirm the authenticity of the user. The system can be configured to use a company directory such as LDAP for authentication by updating the system configuration details.

Authorization

Figure 7:
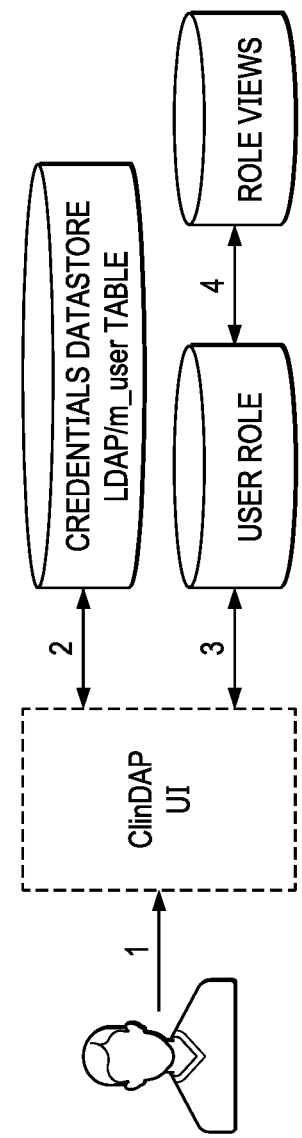
FIG. 7 illustrates one embodiment of the ClinDAP UI of the present invention.

The users for ClinDAP UI can be associated with the list of studies they are working on. The data visibility for the user is governed by the study access provided to the user. The system also provides a role based mechanism to authorize end users access to specific UI views based on their job function. The UI views are associated to the role (s), and based on the role assigned to a user the UI views will be rendered. FIG. 7 illustrates on embodiment of the ClinDAP UI of the present invention.

Using the ClinDAP UI study configuration view, each study can be assigned to a specific data processor to balance the data processing load. For example, a study for which a cumulative load has to be performed can be assigned to run on a specific standalone data processor so regular scheduled data load for other studies is not hampered.

The status of data processing jobs and study data processing is enabled through data processor dashboard in ClinDAP UI. ClinDAP data processor has robust error handling routine, the study which incurs an error condition or exception during the load is flagged with error. The data load for the study is resumed once the system administrator resolves the issue and clears the error flag for the study.

ClinDAP Dataprocessor App

The Dataprocessor app is a command line interface to invoke the Inbound Data Manager data load pipelines, Data Transformation Engine, Aggregates and post processing components. The app can be configured in an enterprise scheduler to invoke processing at specific intervals.

Based on the data volumes and number of studies multiple data processor apps can be enabled to achieve processing load balance. Each processor app can be labeled using a name parameter when invoked. The processor label is compared with the study configuration to identify studies to be processed on the specific processor achieving a high degree of load balancing.

The processor app provides control over what post processing components need to be run by turning them on or off through command line switches. It also provides configurable logging to control the amount of details being emitted in log during the data processing job execution. There is robust error handling and feedback mechanism built into the processing app to enable high efficiencies for operations.

Data Model

The ClinDAP data hub component of the present invention preferably leverages the flexibility and power of a document based noSQL database (MongoDB) to store the source, transformed/standardized and aggregated data. The study metadata, authentication, authorization, logging data etc. are preferably stored in a MySQL relational database.

The subject clinical and transformed/standardized data is preferably stored in a unique data document structure which enables versioning support as the data changes over time. The data is stored in a key-value structure which provides a high degree of flexibility to load study data. Unlike the traditional relational databases, the noSQL database does not require the data structures to be modeled upfront and can be defined dynamically on the fly based on the data. This allows the ClinDAP data hub to be highly flexible and efficient as the clinical data is very dynamic and complex in nature. For example, with study amendments, new data elements such as forms, items, etc. may be added to a study design, which has minimal impact to the ClinDAP data hub. It also supports custom mapping types for data transformation and standardization for which no upfront data modeling is required.

All the source data is first loaded in the raw dataset collection which also tracks the processing status of the data set. The raw dataset is also used for a reconciliation process along with any troubleshooting and re-submitting of dataset for processing.

Clinical Data lake—default collections:
a_adverse_events
a_endpoints
a_faers_cm
a_protocol_deviation
a_stats
a_stats_study
a_subject_recruitment
audit_data
dp_idd
lab_ranges
raw_datasets
site_risk_overview
study_coding_data
subject_clin_data (data model attached)
subject_form_status_data
subject_master
subject_query_data
transformed_datasets Data Processing Configuration Module The IDM component of the present invention works on the Inbound Data Descriptors (IDDs) that define the source data characteristics such as format, data types, key identifiers, etc. IDM uses IDDs to load and process the source data. FIGS. 9-12 illustrate example screen shots of one embodiment of the application of the present invention (e.g., a data processing configuration module component of the ClinDAP UI application). An IDD is defined for each type of data set that will be ingested into the ClinDAP data lake.

Figure 9:
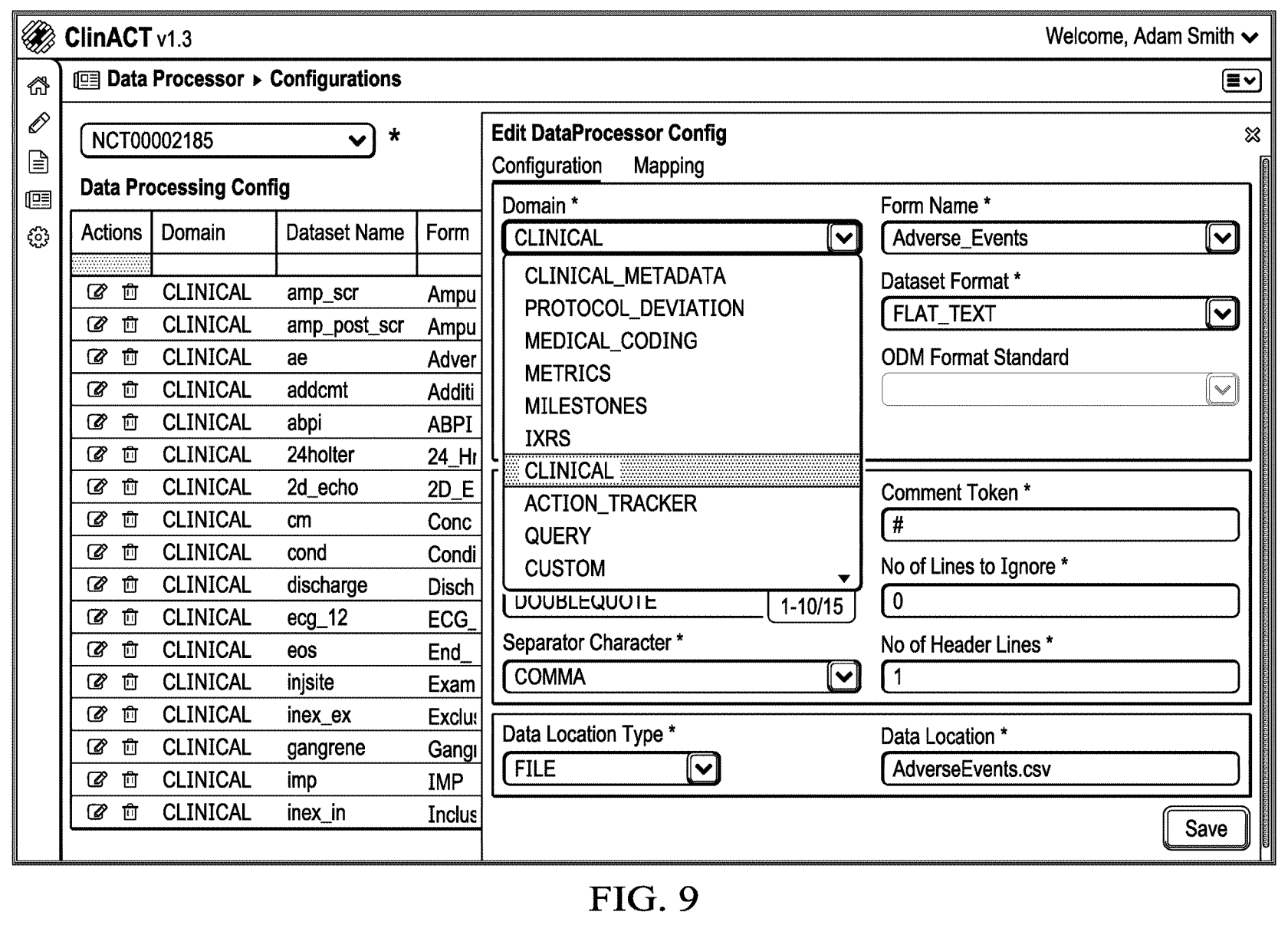

FIG. 9 illustrates a sample screen shot for the data processing configuration module component illustrating the ability to set the domain of the source data (e.g., what kind of data is being loaded). In this case the "clinical" domain is chosen.

Figure 10:
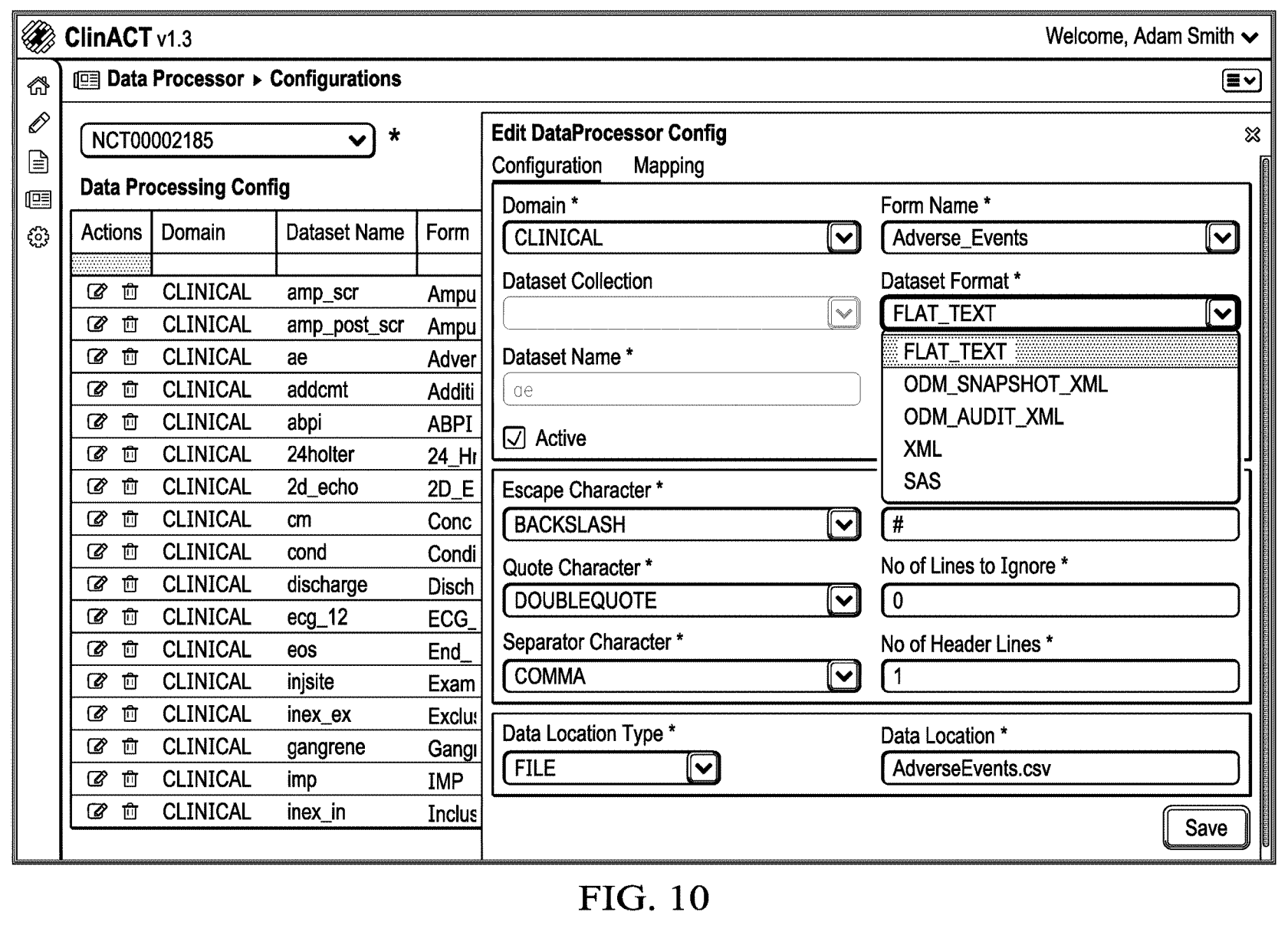

FIG. 10 illustrates a sample screen shoot for the data processing configuration module component illustrating the ability to set the dataset format of the source data. In this case, the source data is in flat-text format. For the flat-text format, the module provides the ability to set key column identifiers for the source data. FIG. 11 illustrates a sample screen shoot for the data processing configuration module component illustrating the ability to set the key column identifier. For the ODM formats, the present invention provides pre-defined key column identifiers.

For the dataset types of FLAT_FILE, LINE_LISTINGS etc. the IDD configuration requires only the key fields to be mapped that will uniquely identify the data set record—key fields: e.g., Subject Column Identifier ("subject" is another word for a patient that is de-identified), Site Column Identifier, Visit column name, Key column Identifier (this is to allow users to define additional keys provided as comma separated value). This process defines the key value structure or pair that was previously discussed.

Figure 12:
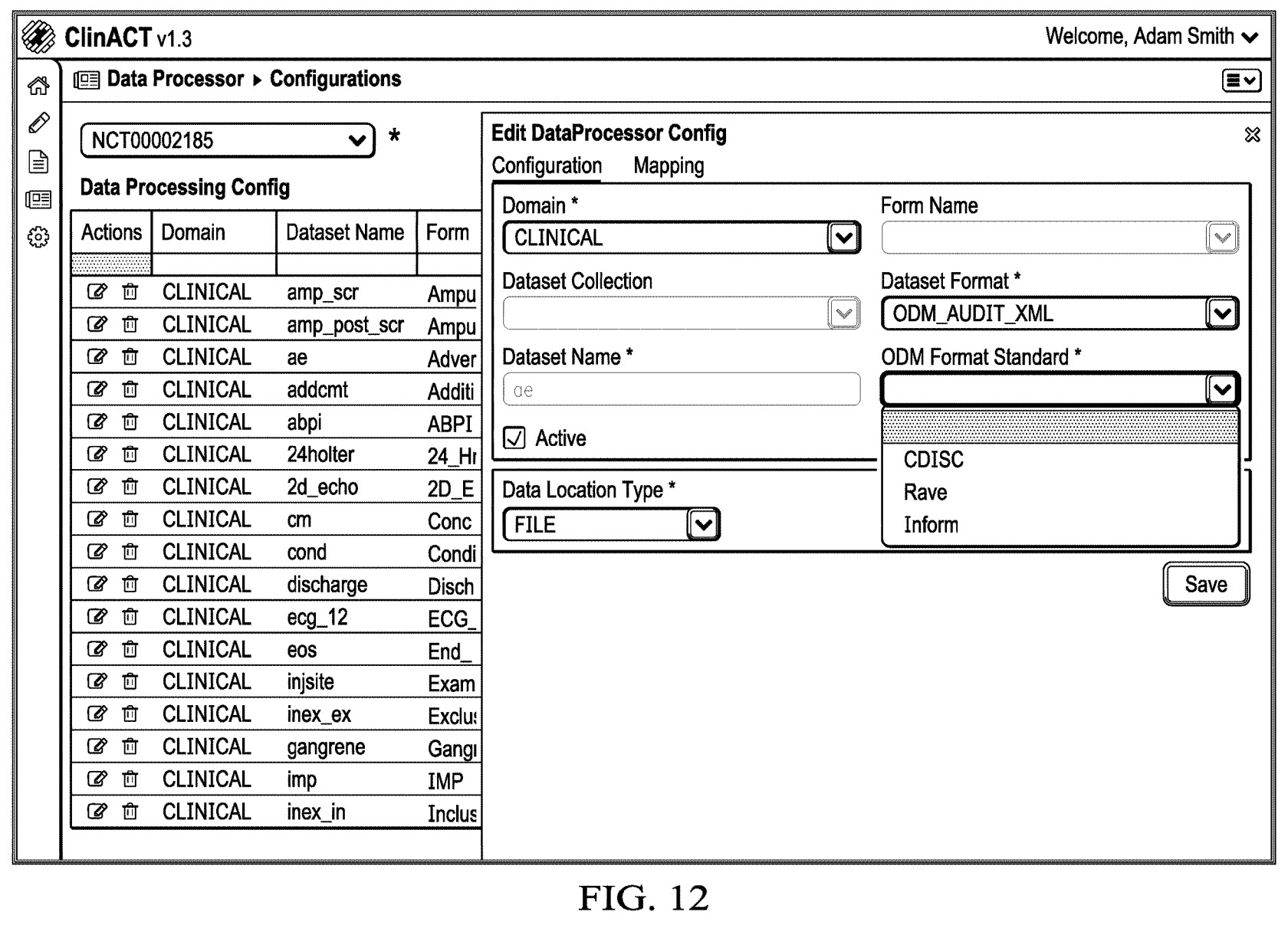

FIG. 12 illustrates a sample screen shoot for the data processing configuration module component illustrating the ability to set the ODM format standard. For example, the module provides the ability to set the format as "CDISC", "Rave", or "Inform". For example, if the source of data is Rave ODM, users will have to configure an IDD to load ODM metadata and an IDD for the ODM data file.

FIG. 12 illustrates a sample screen shoot for the data processing configuration module component illustrating the ability to set the data location type. The IDD can be pointed to load from a specific file every time the file is received or can be directed to load all the data files in a directory. IDM will apply the same directives to all the files if loading from the folder.

During the conduct of a study, a large amount of clinical data is captured in various systems such as EDC, Central Lab, Patient reported outcomes, etc. The structure of the clinical data may vary for each study based on the design of the study. For example, the design could have variations across the therapeutic area or at times within the same sponsor, due to lack of common definition across departments, etc. Due to lack of standard structures, the sponsors today spend a lot of time and effort building complex data warehouse solutions aggregating data for every study that is initiated.

The ClinDAP platform's transformation engine allows customers to standardize the source clinical data ingested from various systems into pre-defined or user configurable target data model. The clinical data across the sources can be used in the transformation engine to output data into the target data model. The target data model can be industry standard CDISC Study Data Tabulation Model (SDTM) format or user can define their own custom model such as custom reporting data model.

The upfront standardization of data to a standard data model (custom or SDTM) reduces the overall cost and effort required to aggregate data for a study and across studies. The oversight and monitoring procedures leveraging the standard data model can be enabled for each study, rather than developing reports and key indicators by study.

Data Aggregation:

The study managers and monitors periodically review the progress of the study leveraging data aggregated at study, country or site level and various key performance indicators on the clinical and operational data. For example, monitoring of Adverse Events (serious and non-serious) rate by severity at site, country and study level, etc. The aggregated data at various levels provides key insights to the study team allowing them to prioritize their tasks and actions.

The ClinDAP platform provides an extensible framework to build aggregations and key performance indications. Out of the box the platform provides aggregations at various levels and key performance indicators. For example, aggregations such as statistical computations on lab, vital stats and end points, key performance indications, listings of adverse events, dispositions and end points, etc. are computed and saved in aggregate collections. The aggregations and KPIs are computed using the study transformed data sets. The aggregated data is also leveraged to build reports and dashboards at study, country and site level. The computed KPIs are used to monitor risk using thresholds defined by the users.

Mapping:

ClinDAP mapping workbench is used to map the source data elements to target data model (custom or SDTM) to transform the clinical data in standardized format. The ClinDAP mapping engine leverages the source to target mapping rules configured by the user to transform the data to the standardized format. The data transformed to the standardized model, is used for aggregations, computing key performance indicators, and study oversight using dashboards and reports. The customer's may also choose to standardize data to custom configurable target data model for specific use cases such as SAE or Lab data reconciliation etc.

Below are few examples of source to target mappings:
a. One to one mapping between the source data element to target field. Example for Adverse Events, the Adverse Event Term can be directly mapped to SDTM AE domain's AETERM field.
b. User can provide a literal value. Literal is a constant value that will be used for all the target data.
c. Use transformation scripts in case the mapping needs additional processing to derive the target value. The scripts can range to simple conversion expressions to complex data computation routines. System provides a SDK with rich library of functions and methods to build the transformation scripts. The scripts are built using Javascript programming language.

The present invention also provides a smart map functionality that can help auto map the source data elements with target data model using advance expression matching patterns and library built using historical mappings. The smart map functionality can use expression matching algorithms, or it may include functionality to use Natural Language Processing to perform the auto map.

Machine Learning Enabled SDTM Mapping Workbench

The CDISC SDTM conversion using the traditional approach such as SAS programing, is complicated and time consuming. It requires experienced programmers with clinical domain expertise to build and validate the mapping. With the this approach the cost of mapping a study to SDTM structures could vary significantly based on the size and complexity of study being mapped.

The ClinDAP platform of the present invention provides a workflow enabled mapping workbench to configure the source to target SDTM mappings. The workbench is an easy to use tool that provides drag and drop features to map source with target SDTM variables. It also has an extensive API that can be used with expression to build complex mapping. The transformation mapping must be configured for each study, based on the unique design of the study. The ClinDAP platform of the present invention provides a Smart Map feature, that uses machine learning and advanced matching algorithms to auto map the source to SDTM target.

The smart map uses machine learning and advanced pattern matching algorithms leveraging regular expressions to match study metadata with SDTM data model, it also leverages historical mappings at Program and Therapeutic level for auto map. Weighted rankings/ranking scores are used in case multiple results for the match is returned. Higher scores are applied to the mappings that have been used more frequently in the past. The ClinDAP's smart map feature leverages a multi-step approach to classify and map the study metadata to SDTM data model.

Sematic Based Classification:

The clinical data for the study loaded into the ClinDAP data lake is parsed to compare with existing built-in or external ontologies such as SnowMED, ICD10 etc. The built-in ontologies are built and tagged over time using data from the existing mappings available in the platform. The source data is compared with available ontologies to classify the study metadata to specific SDTM domain and its variables.

Study Metadata and SDTM Definition:

The study metadata definition is compared with SDTM model using configurable advanced pattern matching algorithms, to auto map the source with target SDTM definition.

Mapping Library:

Library of mapping between SDTM domains and study metadata at Therapeutic and Program level is built using existing mapping for studies in the platform. The library can also be pre-loaded using existing mapping ontology. The smart map engine uses configurable matching algorithms to compare the current study metadata with library at the Therapeutic and Program level to perform auto mapping. The matching with even level of library is done first to compare both form and item—and then with just item definition.

Example of Inbound Data Descriptors to Load Source Data

The clinical and operational data supporting a clinical trial is captured in disparate source systems and formats such as relations databases, SAS datasets, ODM XML, flat files etc. Integrating all the data into a central data repository is a huge challenge for sponsors and Clinical Research Organizations (CRO). The traditional approach of aggregating the data into a data warehouse is very effort intensive and costly. The warehouse also provides limited flexibility to adopt to the dynamic nature of studies, thus increasing the complexity of maintaining such solutions.

The ClinDAP platform uses a big data—data lake, approach over the traditional data warehouse to build an integrated data aggregation platform. The extract load transform (ELT) rather than extract transform load (ELT) architecture is leveraged. With the data lake approach, the platform brings significant efficiencies in effort and cost to enable data integration and aggregation. The data aggregated using ClinDAP is preferably stored in a no-SQL data repository using MongoDB. The platform is source system agnostic and provides ability to consume data originating from any source. Most of the data formats are inherently supported by the platform.

The platform uses Inbound data descriptors to define and tagging the incoming datasets. For the incoming clinical data sets, the users need to provide mapping for just 1-4 key identifies in the inbound data descriptor configuration. All the source data is loaded as key value pair in the back end clinical data lake. The effort required to configure a data load in ClinDAP platform is significantly less than a traditional approach.

The ClinDAP data ingestion engine uses Inbound Data Descriptors (IDD) to load the data into ClinDAP data lake. The data source vendors for clinical and operational data can provide the dataset in different formats such as text delimited, ODM snapshot/audit, SAS xport/data files etc. The IDD allows the user to provide information to the system on identifying the type of data being provided in the data set, structure of the data and high-level mapping such as key fields, etc. The IDD also allows users to do basic transformations at the mapping level using the expression engine such as standardizing of date format or concatenating fields, etc.

Find below the detailed information on one embodiment of the IDD configuration:

Domain—following are valid values for domain attribute in IDD—CLINICAL_METADATA, PROTOCOL_DEVIATION, METRICS, MILESTONES, CODING, IXRS, CLINICAL, QUERY, STUDY_CODING, CUSTOM. The domain definition helps identify which processing pipeline will be used to load the data. CUSTOM domain can be used to dynamically extend the data lake to ingest data sources not available out of box.

Form Name—applicable for loading clinical data provided in text delimited format. For each data set user will setup a IDD and provide the form name to tag the data set. The form name is a drop down built using the metadata configured in the system.

Dataset Format—provides the format of the data files. Valid values—FLAT_TEXT, ODM_SNAPSHOT_XML, ODM_AUDIT_XML, SAS EXPORT and SAS DATA files.

Dataset collection—to be provided in case of custom domain.

Dataset name—user defined name of the IDD. User can provide a friendly name to be able to identify and query the IDDs in future.

ODM Format Standard—Certain vendors create extensions to the standard ODM structure. This IDD attribute identifies the data set ODM extensions to be processed. Valid values—CDISC, Rave and Inform.

In case of FLAT_FILE datasets following additional directives is required to be provided—

Escape character—to change the behaviour of special characters in the data file e.g. in case quote is part of enclosed string field value, it will have to be prefixed with the escape character to process it as data.

Comment Token—the defined token (such as #) can be used to provide additional information in the data file. The rows starting with comment token will not be processed Quote character—Enclosing character used with the string fields (e.g. double quote")

No of Lines to Ignore—Number of lines to ignore processing from the top of data file Separator Character—character separating the data fields in the dataset (e.g. comma, pipe or tab)

No of header lines—number of rows used to define the column headers in the dataset Data location Type—valid values FILE, FOLDER. FILE type is used in case the file with same name is always sent from the source system. In case multiple files are sent for the same IDD configuration, the location type can be configured for FOLDER. All the files in the defined folder will be processed using same IDD configuration.

Data location—folder path where the data files will be uploaded for processing.

The IDD also allows mapping of key attributes of the data set to uniquely identify the records in the data. For the clinical domains following key attributes can be mapped—

Subject

Site

Visit

Key column—to map any additional attributes required to uniquely identify the records. System supports add more than one attribute separated by comma in the key column field.

Configuration of IDDs:

IDDs are configured through the ClinDAP User Interface, specifically the IDD configuration screen or user interface shown in FIGS. 13-16.

Step 1—create a new IDD configuration for a dataset in the system. FIG. 13 illustrates one embodiment of a user interface for creating a new IDD configuration.

Step 2—Update data set parameters. FIG. 14 illustrates one embodiment of a user interface for updating data set parameters for the IDD. Domain, Form Name (required only in case of Dataset format FLAT_TEXT), Dataset Format, Dataset Name, ODM Format Standard (required only in case of Dataset format being ODM_SNAPSHOT_XML or ODM_AUDIT_XML).

Figure 15:
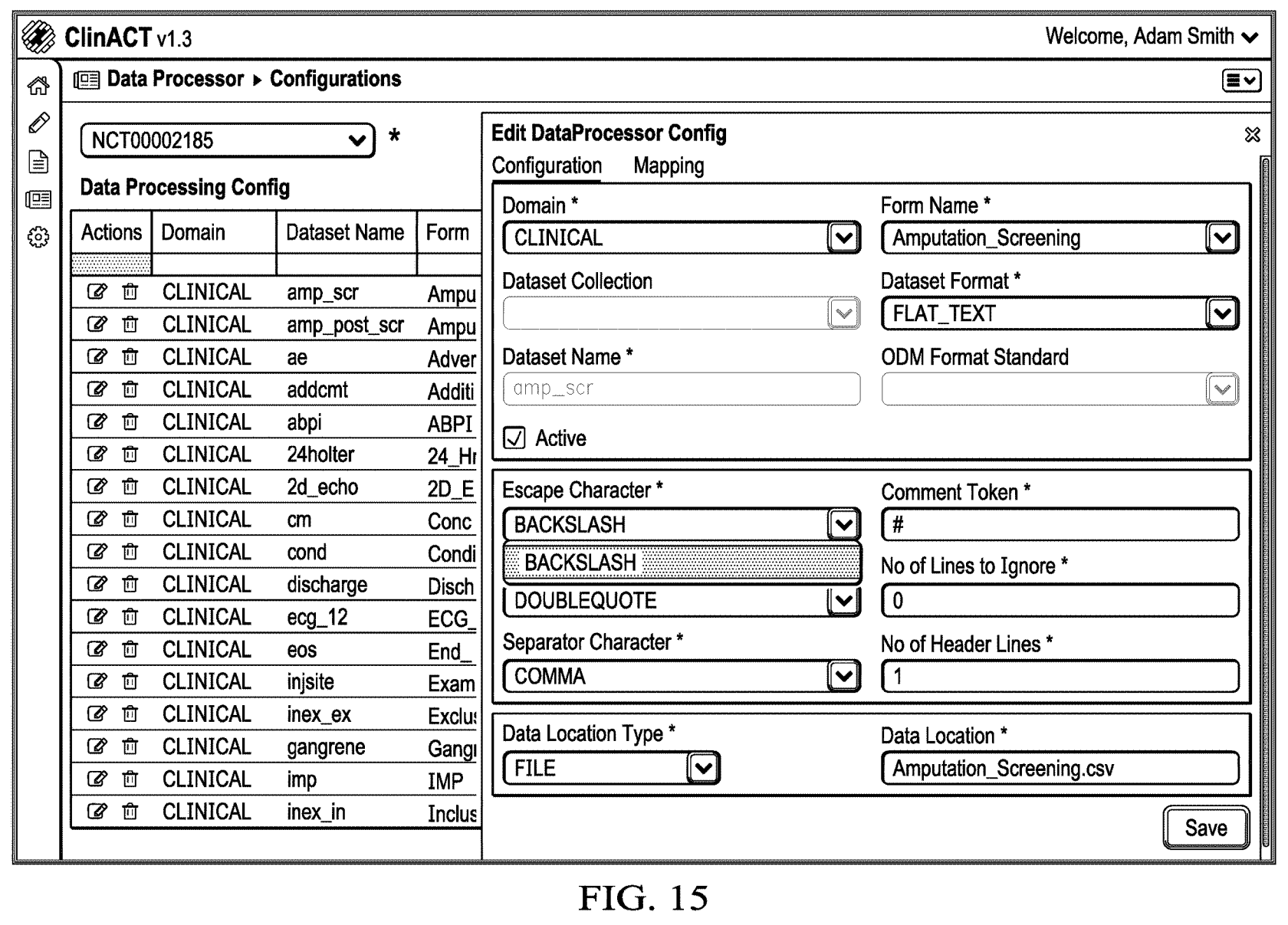

Step 3—in case of dataset format of type FLAT_TEXT update the default directives if required. FIG. 15 illustrates one embodiment of a user interface for updating default directives in the case of a FLAT_TEXT type.

Step 4—Update the mappings tab with appropriate mappings. Note mappings are not required for all the columns in the dataset. Only the key columns are required to be mapped. All the data in the file is dynamically loaded as key value pair. FIG. 16 illustrates one embodiment of a user interface for updating the mappings for the IDD.

Example Process for Reconciling Data Tagged with Raw Dataset Identifiers with Source Data With the overall architecture for the data ingestion using ClinDAP, each dataset being loaded into the clinical data lake is first stored in the raw dataset collection. The data is processed using the source data from the raw data set. Raw dataset also tracks the progress of the data being loaded using a status attribute stored along with the source data. The source data is processed and saved in various target collections in the data lake. The target collection records are stamped with the raw dataset id that can be used for reconciliation with the source data. The raw dataset identifiers can also be used to identify records to rollback in case of failures, due to cases such as corrupt source data etc.

In one embodiment of the invention, the clinical data load pipeline is built using the following pipeline nodes to load data into the subject_clinical_data collection (the IDDs are used by the ingestion engine to identify the inbound dataset's structure, process and load the data): Node 1—raw data set ingress request: The data file received or downloaded electronically from sources such as Rave Web Services (RWS) is first saved as is (in raw format, as downloaded) in rawdataset collection. Rawdataset collection uses GridFS feature of MongoDB to support file sizes greater than 16 MB. For every file loaded into the rawdataset collection there is a unique ID generated (raw dataset identifier)

For each dataset, the rawdataset collection tracks the following attributes—
  studyId—study identifier
  submitter—user submitting the file for processing (can be system user)
  filename—name of the data file with full path
  datasetType—dataset type identifier (e.g. urn:ca:inbound: ds:/SCLI/ae)
  insertionDateTime—date and time when the file was loaded to rawdataset
  processingDateTime—date and time of processing the file
  processingStatus—processing status (PROCESSING_ SUCESS, IN_PROGRESS, PROCESSING_FAILED)
  runId—for each data processor run a unique run id is generated Node 2—Data set formatter: The rawdataset data, based on the format such as ODM (Rave, Infor or CDISC), text delimited, SAS export or SAS data is extracted into a common dataset format (rows and columns).

Node 3—Data object builder: The subject document from subject_clinical_data is retrieved from the database. The extracted data in prior node is transformed into key value pairs by subject. The retrieved subject document is updated in memory with extracted key value pair.

Node 4—Versioning and persisting: The updated subject document is compared with the subject document in subject_clinical_data, in case the updated subject document in memory is different than the subject document in the database, a new version of subject document is created. Note— only version is created per run_id. In case same subject is updated in multiple datasets in the same dataprocessor run only one version is created and saved.

While saving the subject document into subject_ clinical_data, the document is updated with the rawdataset identifier which resulted in the subject data to be updated. In case during a single dataprocess run multiple rawdatasets (source data files) are updating the subject all the rawdataset ids are stored in an array.

During processing of this node, subject master is also built that contains list of all the subject. The subject status is also updated in case of processing ODM files. The process described above explains how loaded data (stored as key-value pairs) are transformed into a desired standardized format.

Example Process for User Interface to Define Source to Target Mapping

The mapping is performed in the ClinDAP platform to map the source data elements to target data model (e.g., custom or SDTM) to transform the clinical data into a standardized format. The ClinDAP mapping engine leverages the source to target mapping rules configured by user to transform the data to the standardized format.

The default CDISC SDTM structure defines standard domains such as –AE, DM etc. The domains identify the type or the entity of the dataset. With each domain, the SDTM model defines domain variables. The domain variables are like entity attributes. SDTM publishes a standard definition set of domains and domain variables but also allows extension of the entities and attributes as required.

With ClinDAP source to mapping tool, user can map both at the domain and domain variable level. The system allows domains to be mapped at the study form metadata level and domain variables can be mapped to study form items level. The mapping tool also provides an advanced expression engine to perform complex mapping such as—cross form reference of fields, perform computations etc. In one embodiment, the latest CDISC SDTM mapping is configured by default loaded as a target data model during the installation. In the case the customer wants to map to the custom target data model, import the model as described in Step 1, else for default SDTM conversion the process starts at Step 2:

Step 1: Build the target data model using the template available to download from the application in Data Standardization->Mapping Type view. Upload the updated template with target model to create a new custom Mapping Type, which can be used in Mapping Step 2: Associate the mapping type (SDTM or custom) with the study metadata version from Data Standardization->Map Versions view Step 3: Build the source to target mapping from Data Standardization->Mapping view Step 3a: Add a new Domain Mapping and configure the following attributes of the mapping—Domain (e.g. AE, CM, DM etc.), Map Name (User defined value), Form OID primary study metadata form used for mapping the domain and Expression (Optional attribute. This can be used to control the condition in which the mapping engine will evaluate the configured mapping)

Step3b: Drill down to variable mapping view from domain map. Start with smart map option, if required configure custom matching expression to improve on smart map results in case there are differences between the domain variables and study meta data items.

Step3c: Review the mappings built using smart map, update the literals and configure expressions for the variables that need complex computation for mapping.

Figure 18:
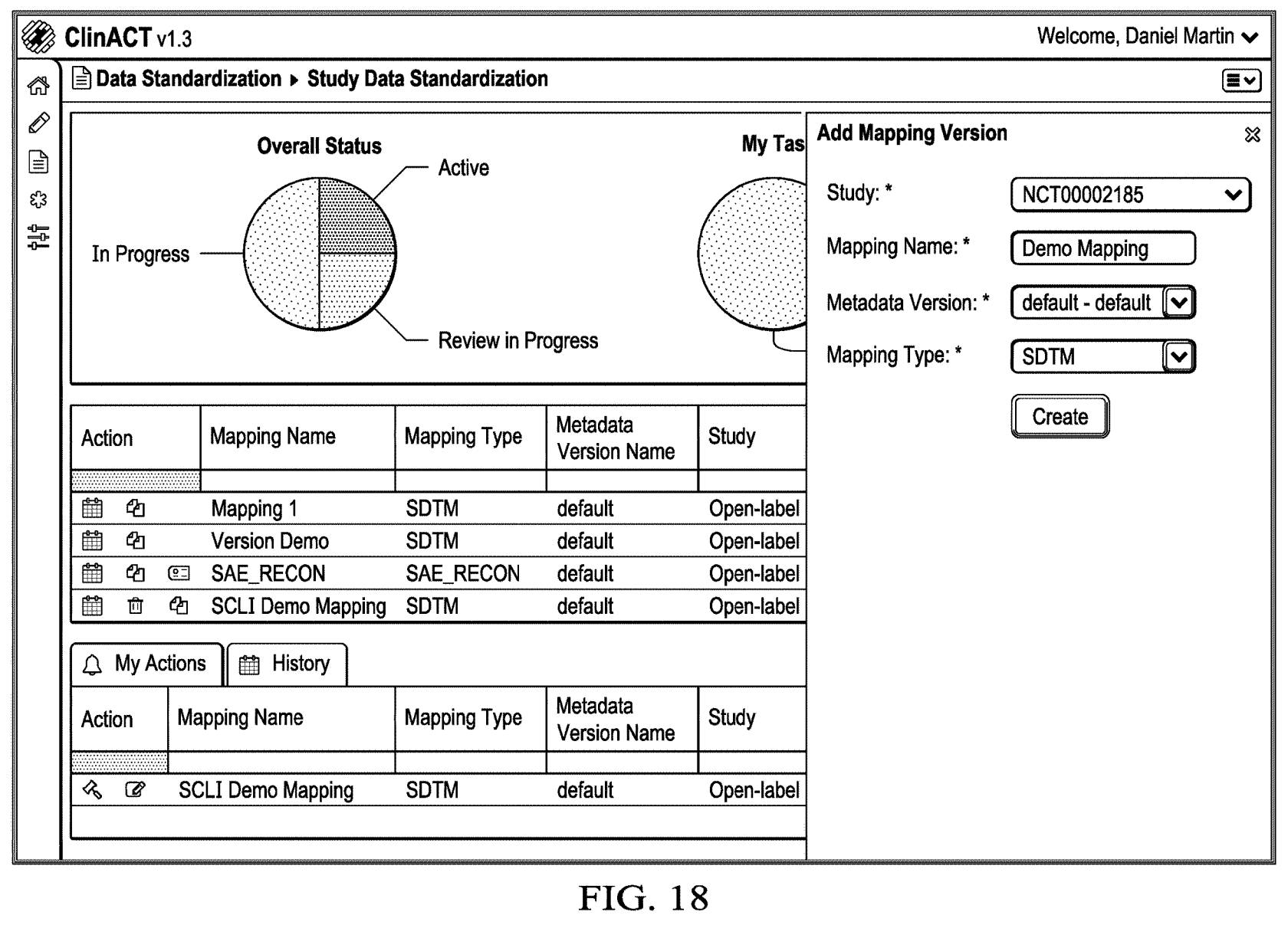
Figure 19:
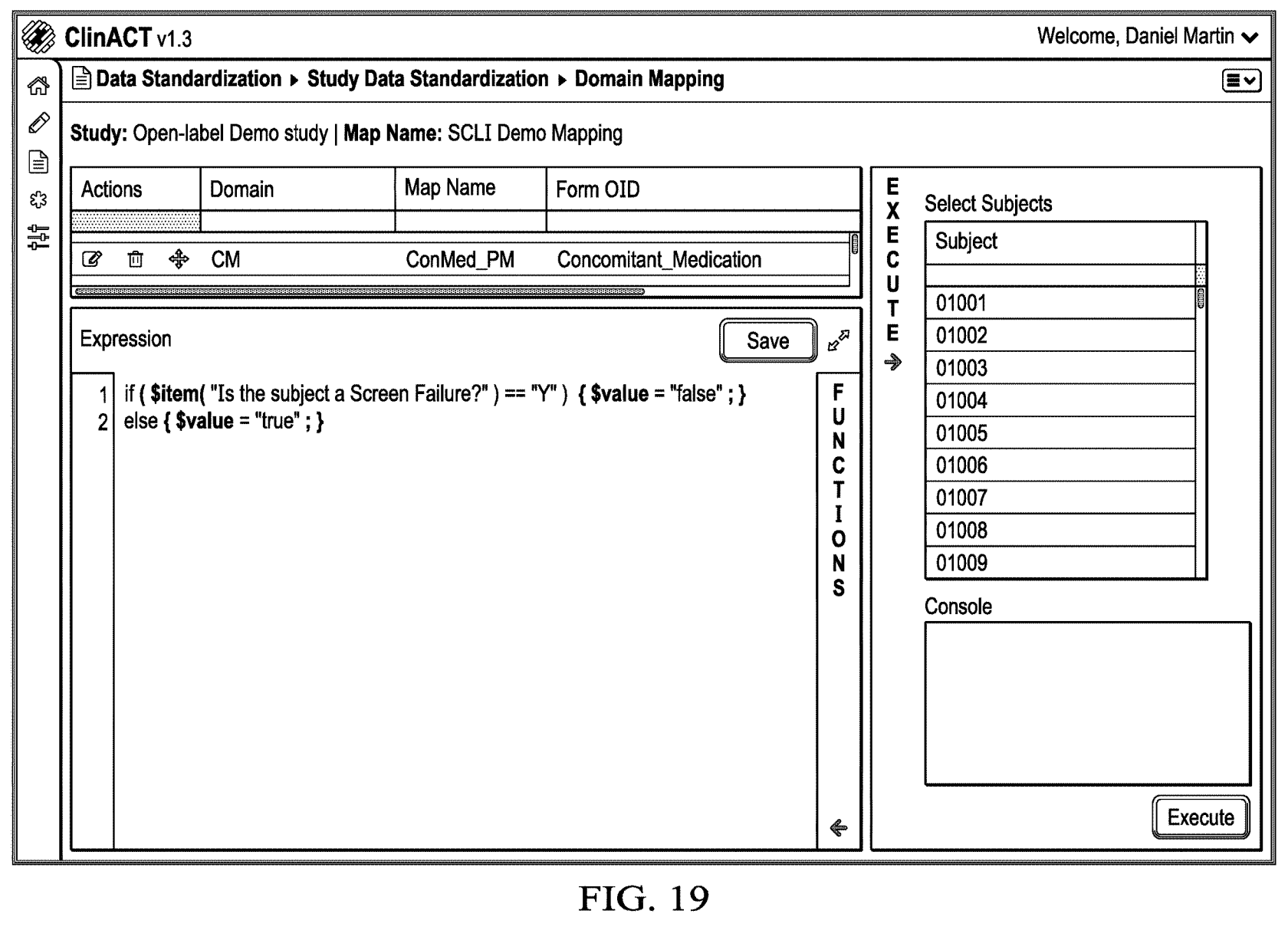
Figure 20:
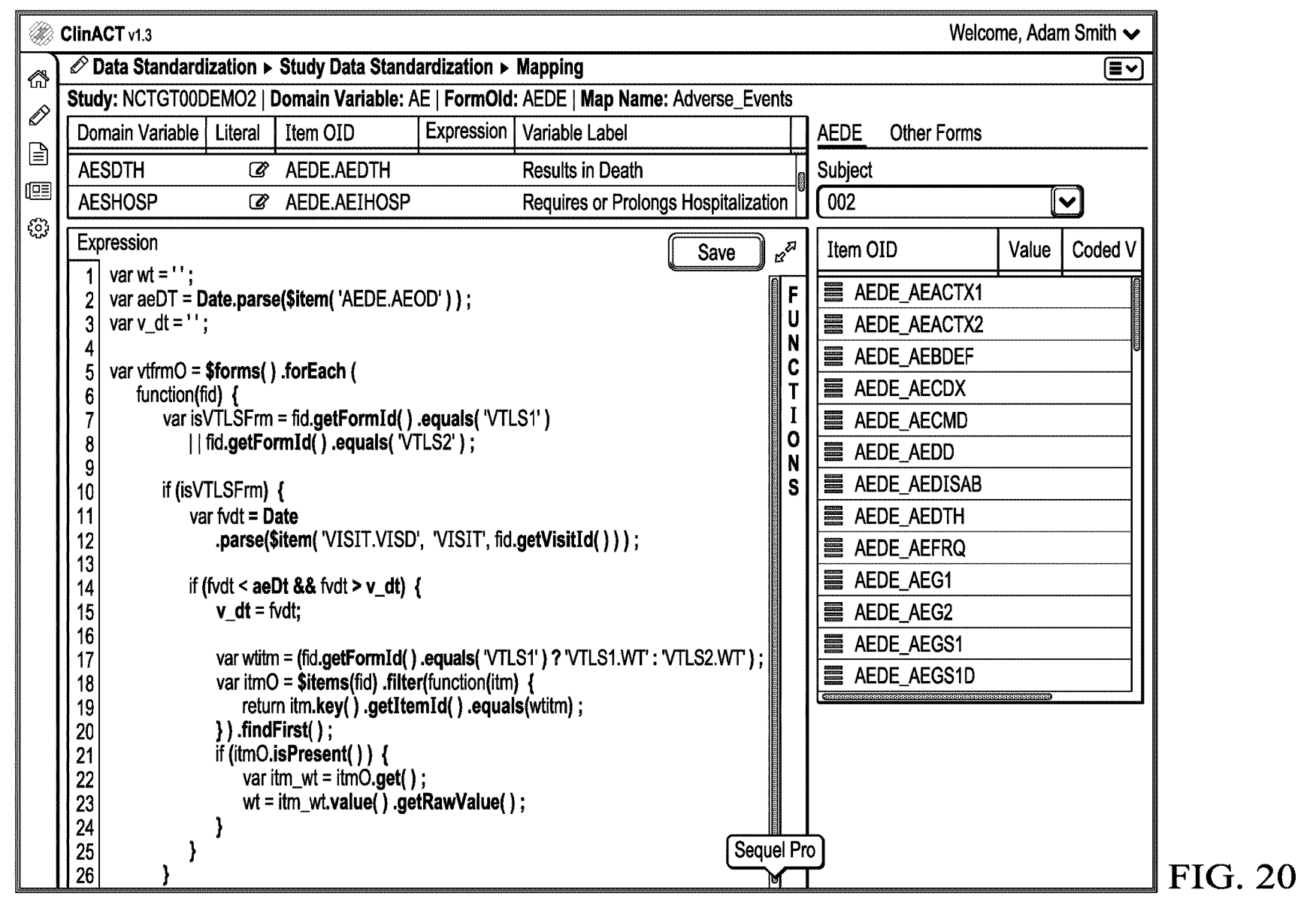

FIG. 17 illustrates one example user interface for the mapping type configuration view. FIG. 18 illustrates an example embodiment of the mapping workbench user interface of the present invention. New mapping can be created for a study, study metadata version and mapping type. FIG. 19 illustrates an example embodiment of the domain mapping user interface of the present invention including form level mapping, expression builder, execution and mapping debug console. FIG. 20 illustrates an example embodiment of the mapping user interface of the present invention including—form item level mapping, expression builder, execution and mapping debug console.

Example Process for Building Data Transformation Rules Using the Data Transformation Engine (e.g., Custom Transformations).

Transformation engine uses the mapping configured for the study by mapping type (SDTM/custom) and study metadata version—to build the transformed data sets. The mappings rules configured (as described in the earlier question) are evaluated to map the source data to the target data model. The transformed data is saved in transformed_datasets collections in MongoDB. Pre-defined domains of transformed data of type SDTM is also saved in subject_clinical_data collection to support ClinACT—Risk based monitoring platform.

Library of functions are built using Javascript and deployed as part of the transformation engine. Nashorn framework is leveraged to allow execution of Javascript within Java runtime environment. All the functions in the library are available to the expressions which can be used for building transformation rules. FIG. 21 illustrates one example of a graphical user interface showing available library of expressions.

Smart Map Feature

Figure 22:
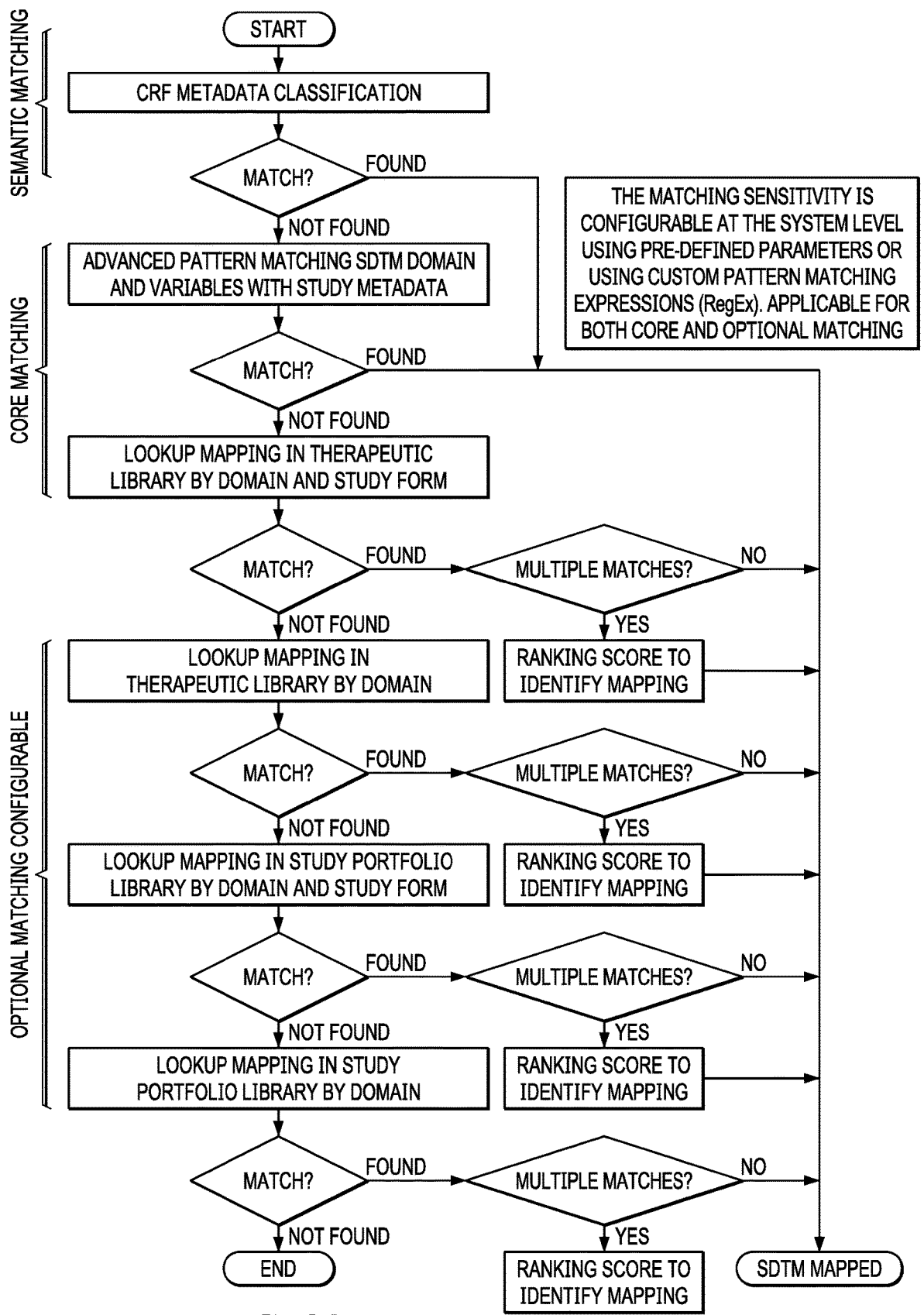
FIG. 22 illustrates one embodiment of the smart map process of the present invention.

The ClinDAP platform provides a smart map feature that allows auto mapping of study metadata to SDTM structure. The smart map uses machine learning and advanced pattern matching algorithms leveraging regular expressions to match study metadata with SDTM definition and use past historical mappings at program or Therapeutic level to auto map. Weighted rankings/ranking scores are used in case multiple results for the match is returned. Higher score is applied to the mappings that have been used more frequently in the past. FIG. 22 illustrates one embodiment of the smart map process of the present invention.

Post-processing of Load Data

In one embodiment of the invention, the post processing pipeline has various nodes that can be enabled based on customer specific requirements. The following is the list of all the post processing nodes:

| Post processing node | Description | Aggregation |
| --- | --- | --- |
| Cleanliness | Triggers subject holistic records for central medical monitor to review based on medical monitoring plan setup. | No |
| MongoDBScripts | Pipeline node to execute mongo scripts configured to build aggregations. The scripts are developed using MongoDB aggregate commands or map reduce functions to build aggregation collections. aggregate list of adverse events across studies aggregate list of end points across studies aggregate list of product deviations statistical computations by study ARM - avg, min, max, standard deviation, median, firstQuartile, thridQuartile for lab tests, vital stats, end points statistical computations across study - avg, min, max, standard deviation, median, firstQuartile, thridQuartile for lab tests, vital stats, end points subject recruitment summary and listing aggregations | Yes |
| MissingForms | Missing forms aggregation computes and aggregates number of missing forms i.e. not completed by Investigators Forms marked as mandatory for the visit but not completed in EDC system For overdue subject visits as per the visit calendar (computed by another post processing node), all the mandatory forms associated with the overdue visit is part of missing forms. | Yes |

-continued

| Post processing node | Description | Aggregation |
|---|---|---|
| OpenQueries | Open queries compute the total number of open queries and aggregates the list of open querying in an aggregation table for reporting | Yes |
| StudyCodeList | Using the study code list loaded through ingestion engine - associated the coded value with the raw item values | No |
| RecruitmentPlan | Recruitment plan aggregates actual subject recruitment by month, which is used in dashboards such as recruitment planned vs. actual. | Yes |
| SDTM | Post processing node to execute SDTM transformations supporting ClinACT RBM tool. The result of the SDTM post processing node is saved in subject_clinical_data collection along with subject data. | No |
| Transform | Post processing node to execute SDTM and all the custom transformation mappings. The data from Transform post processing node is saved in transformed_datasets collection | No |
| TriggerActions | Post processing node to trigger medical actions e.g. in case LAB values are outside the control limits | No |
| TriggerRiskReview | Trigger risk reviews based on the risk and monitoring plan. Monitoring plan can have threshold based or cadence based rules configured | No |
| UncodedTerms | UncodedTerms compute the total number of uncoded terms i.e. item values marked as coded in the metadata but corresponding values in code list is not available | Yes |
| VisitCalendar | VisitCalendar node computes the future visits for subject using the subject visit template and past completed visits. The computed data is stored in subject_master collection. | Yes |

Dynamically Turning on Pipeline Nodes

The data ingesting and post processing pipelines are preferably invoked using ClinDAP data processor command line utility.

Ingestion—The ingestion pipe line that needs to be invoked is controlled through the IDD configuration (screen shots included above). Based on the data being received, the user can make relevant IDDs active and data processor will only execute those pipelines. For ingestion, in one embodiment, specific nodes cannot be turned on, it is the entire pipeline that gets turned on or off.

Post processing—In case of post processing, individual nodes (listed above in the document) can be turned on by passing comma separated parameter value to the data processor.

In one embodiment of the invention the present invention for system for loading and mapping source data into a predetermined standard format, is comprised of a:
 a database for storing the source data;
 a graphical user interface comprised of multiples screens for displaying on a display screen, the graphical user interface having:
  i) a first area having a user selectable list of types of source data that can be loaded by the system (see, e.g., FIG. 8, showing the drop-down menu allowing a user to select the type of source data to be ingested and loaded);
  ii) a second area having a user selectable list of data formats of the source data (see, e.g., FIG. 10, showing the drop-down menu allowing a user to select the type of data format for the source data);
  iii) a third area configured to allow a user to input a plurality of key identifiers for the source data, wherein each key identifier identifies a predetermined data item or items of the data source (see, e.g., FIG. 11, showing an example user interface area for allowing a user to input a plurality of key identifiers for the source data);
  iv) a fourth area for setting mapping rules by mapping a plurality of data items to a plurality of target fields or variables of the predetermined standard format (see, e.g., FIGS. 18-20, illustrating example user interfaces for setting mapping rules);
  v) a fifth area for inputting a plurality of expressions, wherein each of the expressions are used to transform a predetermined data item or items of the source data into a target value (see, e.g., FIGS. 19-20, illustrating example user interfaces for inputting mapping expressions);
 a hardware processing system, the hardware processing system programmed with instructions for executing on the hardware processing system for: 1) loading data items of the source data into the database as pairs of key identifier and value for each data item or items; 2) transforming the loaded source data using the mapping rules and expressions into a predetermined standard format; 3) comparing loaded source data with stored ontology data and mapping data items from the source data to variables of the predetermined standard format; 4) comparing the source data with a model of the predetermined standard format and using pattern matching algorithms to automatically map the source data to the predetermined standard format.

In one embodiment, the hardware processing system is programmed with instructions for executing on the hardware processing system to automatically configure key identifiers for data sources that are standard data formats. The hardware processing system can also be programmed with instructions for executing on the hardware processing system to compare the source data with a model of the predetermined standard format using pattern matching algorithms to automatically map the source data to the predetermined standard format. Additionally, the hardware processing system is programmed with instructions for executing on the hardware processing system to use configurable matching algorithms to compare metadata of the source data with a stored mapping library to automatically map the source data to the predetermined standard format.

While certain embodiments of the present invention are described in detail above, the scope of the invention is not to be considered limited by such disclosure, and modifications are possible without departing from the spirit of the invention as evidenced by the following claims:

What is claimed is:

1. A system for loading and mapping source data into a predetermined standard format, the system comprising:
    a data hub configured to receive the source data from one or more external databases and to store the received source data;
    a graphical user interface comprised of multiples screens for displaying on a display screen, the graphical user interface having:
        i) an area having a user selectable list of data formats of the source data;
        ii) an area configured to allow a user to input a plurality of key identifiers for the source data, wherein each key identifier identifies a predetermined data item or items of the source data;
        iii) an area for setting mapping rules that are operative to map a plurality of data items to a plurality of target fields or variables of the predetermined standard format;
        iv) an area for inputting a plurality of expressions, wherein each of the expressions are used to transform a predetermined data item or items of the source data into a target value;
    a hardware processing system, the hardware processing system programmed with instructions for executing on the hardware processing system for: 1) extracting data items of the source data from the one or more external databases; 2) loading the extracted data items into the data hub as pairs of key identifier and value for each data item or items; and 3) transforming the loaded source data using the mapping rules into a predetermined standard format.

2. The system of claim 1, wherein the key is a unique identifier and the value is a value identified by the key.

3. The system of claim 1, wherein the graphical user interface has an area for defining the characteristics of the incoming file.

4. The system of claim 1, wherein the hardware processing system is programmed with instructions for executing on the hardware processing system to automatically configure key identifiers for source data that are in a standard data format.

5. The system of claim 1, wherein the hardware processing system is programmed with instructions for executing on the hardware processing system to: 1) compare loaded source data with stored ontology data; and 2) map data items from the source data to variables of the predetermined standard format.

6. The system of claim 1, wherein the hardware processing system is programmed with instructions for executing on the hardware processing system to compare the source data with a model of the predetermined standard format using pattern matching algorithms to automatically map the source data to the predetermined standard format.

7. The system of claim 6, wherein the hardware processing system is configured to learn previously applied mapping rules and to automatically apply said mapping rules to future occurrences of similar data transformations.

8. The system of claim 1, wherein the hardware processing system is programmed with instructions for executing on the hardware processing system to compare the metadata of the source data with the variables of the predetermined standard format using pattern matching algorithms to automatically map the source data to the predetermined standard format.

9. The system of claim 1, wherein the hardware processing system is programmed with instructions for executing on the hardware processing system to use configurable matching algorithms to compare metadata of the source data with a stored mapping library to automatically map the source data to the predetermined standard format.

10. The system of claim 9, wherein the stored mapping library is a library of mapping between domains of the predetermined standard format with source data metadata.

11. A system for loading and mapping source data into a predetermined standard format, the system comprising:
    a data hub configured to receive the source data from one or more external databases and to store the received source data;
    an inbound data manager, as a component of the data hub, that acts as an interface between the data hub and the one or more external databases and is configured to load the source data to the data hub with no transformation to the source data;
    a graphical user interface comprised of multiple screens for displaying on a display screen, the graphical user interface having:
        i) a first area having a user selectable list of types of source data that can be loaded by the system;
        ii) a second area having a user selectable list of data formats of the source data;
        iii) a third area configured to allow a user to input a plurality of key identifiers for the source data, wherein each key identifier identifies a predetermined data item or items of the source data;
        iv) a fourth area for setting mapping rules by mapping a plurality of data items to a plurality of target fields or variables of the predetermined standard format;
        v) a fifth area for inputting a plurality of expressions, wherein each of the expressions are used to transform a predetermined data item or items of the source data into a target value;
    a hardware processing system, the hardware processing system programmed with instructions for executing on the hardware processing system for: 1) extracting data items of the source data from the one or more external databases; 2) loading the extracted data items of the source data without transformation into the data hub as pairs of key identifier and value for each data item or items; 3) transforming the loaded source data using the mapping rules into a predetermined standard format; 4) comparing loaded source data with stored ontology data; and 5) mapping data items from the source data to variables of the predetermined standard format.

12. The system of claim 11, wherein the key is a unique identifier and the value is a value identified by the key.

13. The system of claim 11, wherein the graphical user interface has an area for defining the characteristics of the incoming file.

14. The system of claim 11, wherein the hardware processing system is programmed with instructions for executing on the hardware processing system to automatically configure key identifiers for source data that are in a standard data format.

15. The system of claim 11, wherein the hardware processing system is programmed with instructions for executing on the hardware processing system to compare the source data with a model of the predetermined standard format using pattern matching algorithms to automatically map the source data to the predetermined standard format.

16. The system of claim 15, wherein the hardware processing system is configured to learn previously applied mapping rules and to automatically apply said mapping rules to future occurrences of similar data transformations.

17. The system of claim 11, wherein the hardware processing system is programmed with instructions for executing on the hardware processing system to compare the metadata of the source data with the variables of the predetermined standard format using pattern matching algorithms to automatically map the source data to the predetermined standard format.

18. The system of claim 11, wherein the hardware processing system is programmed with instructions for executing on the hardware processing system to use configurable matching algorithms to compare metadata of the source data with a stored mapping library to automatically map the source data to the predetermined standard format.

19. The system of claim 18, wherein the stored mapping library is a library of mapping between domains of the predetermined standard format with source data metadata.

20. A system for loading and mapping source data into a predetermined standard format, the system comprising:
   a data hub configured to receive the source data from one or more external databases and to store the received source data in a noSQL database format;
   an inbound data manager, as a component of the data hub, that acts as an interface between the data hub and the one or more external databases and is configured to load the source data to the data hub with no transformation to the source data;
   a graphical user interface comprised of multiple screens for displaying on a display screen, the graphical user interface having:
      i) a first area having a user selectable list of types of source data that can be loaded by the system;
      ii) a second area having a user selectable list of data formats of the source data;
      iii) a third area configured to allow a user to input a plurality of key identifiers for the source data, wherein each key identifier identifies a predetermined data item or items of the source data;
      iv) a fourth area for setting configurable mapping rules by mapping a plurality of data items to a plurality of target fields or variables of the predetermined standard format;
      v) a fifth area for inputting a plurality of expressions, wherein each of the expressions are used to transform a predetermined data item or items of the source data into a target value;
   a hardware processing system, the hardware processing system programmed with instructions for executing on the hardware processing system for: 1) extracting data items of the source data from the one or more external databases; 2) loading the extracted data items of the source data without transformation into the data hub as pairs of key identifier and value for each data item or items; 3) transforming the loaded source data using the configurable mapping rules and expressions through a built-in rules engine into a predetermined standard format; 4) comparing loaded source data with stored ontology data and mapping data items from the source data to variables of the predetermined standard format; 5) comparing the source data with a model of the predetermined standard format and using pattern matching algorithms to automatically map the source data to the predetermined standard format; and 6) learning previously applied mapping rules and automatically applying said mapping rules to future occurrences of similar data transformations.

21. The system of claim 20, wherein the key is a unique identifier and the value is a valued identified by the key.

22. The system of claim 20, wherein the graphical user interface has an area for defining the characteristics of the incoming file.

23. The system of claim 20, wherein the hardware processing system is programmed with instructions for executing on the hardware processing system to automatically configure key identifiers for source data that are in a standard data format.

24. The system of claim 20, wherein the hardware processing system is programmed with instructions for executing on the hardware processing system to compare the source data with a model of the predetermined standard format using pattern matching algorithms to automatically map the source data to the predetermined standard format.

25. The system of claim 20 wherein the hardware processing system is programmed with instructions for executing on the hardware processing system to use configurable matching algorithms to compare metadata of the source data with a stored mapping library to automatically map the source data to the predetermined standard format.

26. The system of claim 25, wherein the stored mapping library is a library of mapping between domains of the predetermined standard format with source data metadata.

* * * * *